US012572607B1

(12) United States Patent
Muttreja et al.

(10) Patent No.: US 12,572,607 B1
(45) Date of Patent: Mar. 10, 2026

(54) UNIFIED EXPERIENCE FOR OBSERVABILITY OF A CLOUD-NATIVE CELLULAR NETWORK FROM A NETWORK OPERATIONS CENTER

(71) Applicant: DISH Wireless L.L.C., Englewood, CO (US)

(72) Inventors: Madhuri Muttreja, Parker, CO (US); Hrushikesh Shrikant Nanal, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/928,683

(22) Filed: Oct. 28, 2024

(51) Int. Cl.
| | |
|---|---|
| *G06F 16/95* | (2019.01) |
| *G06F 9/451* | (2018.01) |
| *G06F 16/951* | (2019.01) |

(52) U.S. Cl.
CPC ............ *G06F 16/951* (2019.01); *G06F 9/451* (2018.02)

(58) Field of Classification Search
CPC ...................................................... G06F 16/951
USPC ........................................................... 707/709
See application file for complete search history.

(56) References Cited

U.S. PATENT DOCUMENTS

| | | | | |
|---|---|---|---|---|
| 2022/0283926 A1 * | 9/2022 | Chirkin | ............... | G06F 11/3698 |
| 2024/0340761 A1 * | 10/2024 | Waje | ...................... | H04W 40/28 |
| 2024/0430331 A1 * | 12/2024 | Szabó | ................. | H04L 43/0852 |

FOREIGN PATENT DOCUMENTS

| | | | | |
|---|---|---|---|---|
| WO | WO-2019051653 A1 * | 3/2019 | .............. | H04W 4/06 |
| WO | WO-2020226979 A2 * | 11/2020 | .............. | H04L 67/51 |
| WO | WO-2022271042 A1 * | 12/2022 | ........... | G06F 9/5027 |

* cited by examiner

*Primary Examiner* — Syling Yen

(74) *Attorney, Agent, or Firm* — Lowenstein Sandler LLP

(57) ABSTRACT

Technologies for collecting and presenting telemetry data, including first tier data and second tier data, associated with one or more sources in a singular comprehensive view using a data catalog and a service catalog of a data management platform are described. One method collects telemetry data from a plurality of different data sources in different network domains in a cellular network, and stores the telemetry data in an object store. The method uses a crawler to generate a data catalog from the telemetry data stored in the object store by automatically discovering, indexing, and cataloging the first tier data and the second tier data from the plurality of different data sources in the different network domains. The method presents a graphical user interface (GUI) with real-time updates of geospatial information for at least one of the first tier data or the second tier data in the singular comprehensive view.

22 Claims, 9 Drawing Sheets

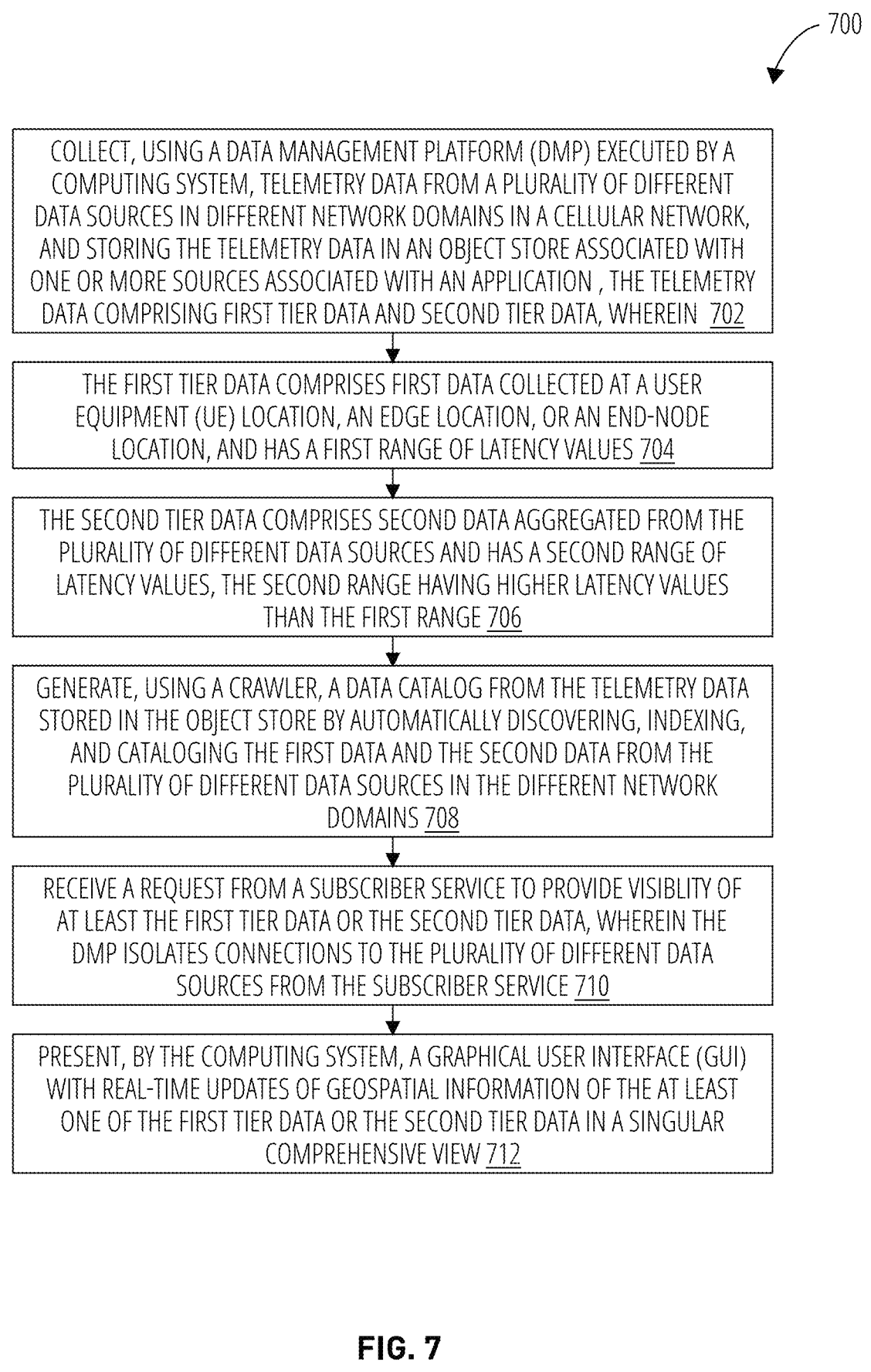

700

COLLECT, USING A DATA MANAGEMENT PLATFORM (DMP) EXECUTED BY A COMPUTING SYSTEM, TELEMETRY DATA FROM A PLURALITY OF DIFFERENT DATA SOURCES IN DIFFERENT NETWORK DOMAINS IN A CELLULAR NETWORK, AND STORING THE TELEMETRY DATA IN AN OBJECT STORE ASSOCIATED WITH ONE OR MORE SOURCES ASSOCIATED WITH AN APPLICATION , THE TELEMETRY DATA COMPRISING FIRST TIER DATA AND SECOND TIER DATA, WHEREIN  702

THE FIRST TIER DATA COMPRISES FIRST DATA COLLECTED AT A USER EQUIPMENT (UE) LOCATION, AN EDGE LOCATION, OR AN END-NODE LOCATION, AND HAS A FIRST RANGE OF LATENCY VALUES 704

THE SECOND TIER DATA COMPRISES SECOND DATA AGGREGATED FROM THE PLURALITY OF DIFFERENT DATA SOURCES AND HAS A SECOND RANGE OF LATENCY VALUES, THE SECOND RANGE HAVING HIGHER LATENCY VALUES THAN THE FIRST RANGE 706

GENERATE, USING A CRAWLER, A DATA CATALOG FROM THE TELEMETRY DATA STORED IN THE OBJECT STORE BY AUTOMATICALLY DISCOVERING, INDEXING, AND CATALOGING THE FIRST DATA AND THE SECOND DATA FROM THE PLURALITY OF DIFFERENT DATA SOURCES IN THE DIFFERENT NETWORK DOMAINS 708

RECEIVE A REQUEST FROM A SUBSCRIBER SERVICE TO PROVIDE VISIBLITY OF AT LEAST THE FIRST TIER DATA OR THE SECOND TIER DATA, WHEREIN THE DMP ISOLATES CONNECTIONS TO THE PLURALITY OF DIFFERENT DATA SOURCES FROM THE SUBSCRIBER SERVICE 710

PRESENT, BY THE COMPUTING SYSTEM, A GRAPHICAL USER INTERFACE (GUI) WITH REAL-TIME UPDATES OF GEOSPATIAL INFORMATION OF THE AT LEAST ONE OF THE FIRST TIER DATA OR THE SECOND TIER DATA IN A SINGULAR COMPREHENSIVE VIEW 712

FIG. 7

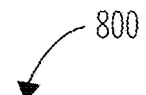

800

STORE A COMMON DATA PROCESSING ENGINE IN A SERVICE CATALOG OF A DATA MANAGEMENT PLATFORM (DMP) ASSOCIATED WITH A CELLULAR NETWORK, WHEREIN THE COMMON DATA PROCESSING ENGINE IS CONFIGURED TO INGEST, PROCESS, STORE, AND DELIVER TELEMETRY DATA FROM A DATA SOURCE IN THE CELLULAR NETWORK, WHEREIN THE TELEMETRY DATA COMPRISES FAULT, CONFIGURATION, ACCOUNTING, PERFORMANCE, AND SECURITY (FCAPS) DATA  802

DEPLOY, BY A COMPUTING SYSTEM EXECUTING THE DMP, A FIRST INSTANCE OF THE COMMON DATA PROCESSING ENGINE AT A FIRST EVENT MANAGER ASSOCIATED WITH A FIRST DATA SOURCE IN A FIRST NETWORK DOMAIN IN THE CELLULAR NETWORK, THE FIRST EVENT MANAGER COMPRISING A FIRST DATA SUBSCRIBER TO OUTPUT FIRST FCAPS DATA TO AN OBJECT STORE ASSOCIATED WITH AN ACCOUNT 804

DEPLOY, BY THE COMPUTING SYSTEM, A SECOND INSTANCE OF THE COMMON DATA PROCESSING ENGINE AT A SECOND EVENT MANAGER ASSOCIATED WITH A SECOND DATA SOURCE IN A SECOND NETWORK DOMAIN IN THE CELLULAR NETWORK, THE SECOND NETWORK DOMAIN BEING DIFFERENT THAN THE FIRST NETWORK DOMAIN, AND THE SECOND EVENT MANAGER COMPRISING A SECOND DATA SUBSCRIBER TO OUTPUT SECOND FCAPS DATA TO THE OBJECT STORE ASSOCIATED WITH THE ACCOUNT 806

FIG. 8

UNIFIED EXPERIENCE FOR OBSERVABILITY OF A CLOUD-NATIVE CELLULAR NETWORK FROM A NETWORK OPERATIONS CENTER

BACKGROUND

Telecommunication networks, such as cellular networks, have various resources that produce data and metadata concerning operations of the cellular network. Metadata is data that provides information about data. Metadata enriches the data with information about one or more aspects of the data. Metadata insights can facilitate efficient processing and understanding of the data. Status reports, including error codes, may be generated, which are indicative of deficiencies in operations of the network. With the development of information technology, data used in different applications can be large in volume and complex in variety. The data can include a great quantity of diverse information from various data sources/data owners. With the development of communication technologies, such as fifth generation (5G) new radio (NR) cellular networks, applications supporting a massive number of connected devices are enabled. Such applications can be based on data from a myriad of sources, including third-party sources. Obtaining insight of the data can be important to create and capture value from the data, for example, to develop data products.

The 5G NR cellular networks being cloud-native architectures has created a very vast opportunity to use the data from the network to create service-level agreement (SLA) driven network of networks, private networks, etc. There are opportunities to bring the value from data that is generated by the 5G NR cellular network, given that the cellular network can be an open, secure, flexible, cloud-native network. 5G NR cellular networks now have the capability to build intelligence at every cell tower, at various network tiers from National Data Center, Regional Data Center, Edge Data centers including the Cell Sites. All the components that are software driven can use this opportunity. However, with this opportunity, telecommunication companies will have enormous amounts of data at hand that can lead to automation and orchestration with advanced intelligence driven from the network. This can be monetized with enterprise customers.

Scaling, from a data perspective, is a huge challenge knowing the spread of the network nodes across tiers, cloud-computing regions, and cell-sites. To enable the data-scientists and data engineers, the data needs to be easily accessible, visible securely and of good quality. Data quality is the measure of how well suited a data set is to serve its specific purpose. Data that is deemed fit to serve the specific purpose in a particular context is considered high-quality data. Low-quality data can be of low value and lead to poor decision-making. As cellular networks scale, the data management at scale becomes challenging. For example, the applications in the 5G network require fast data processing and low latency to enable real-time communications. The data of the applications can include unstructured data, which makes it difficult for application developers to parse, analyze and use the data efficiently. This also leads to inefficient use of developer resources.

In the fast-paced telecom sector, it is vital to address (i.e., analyze and resolve) network performance issues thoroughly to ensure smooth delivery of services like VoNR and SMS/MMS/Data, or other vital data-intensive communication services. Identifying network performance irregularities and predicting usage patterns are key to maintaining service quality and customer satisfaction. Analyzing customer behavior through data analysis helps optimize network operations with Standardized Design and Architecture for a competitive edge. However, conventionally, there are no mechanisms for proactively identifying network performance irregularities and predicting usage patterns, especially at scale.

BRIEF DESCRIPTION OF DRAWINGS

The present disclosure is illustrated by way of example, and not by way of limitation, in the figures of the accompanying drawings.

FIG. 7 is a flow chart of a method of collecting and presenting first tier data and second tier data in a singular comprehensive view according to at least one embodiment.

FIG. 8 is a flow chart of a method of deploying instances of a common data processing engine in different locations in a cellular network according to at least one embodiment.

DETAILED DESCRIPTION

Figure 1:
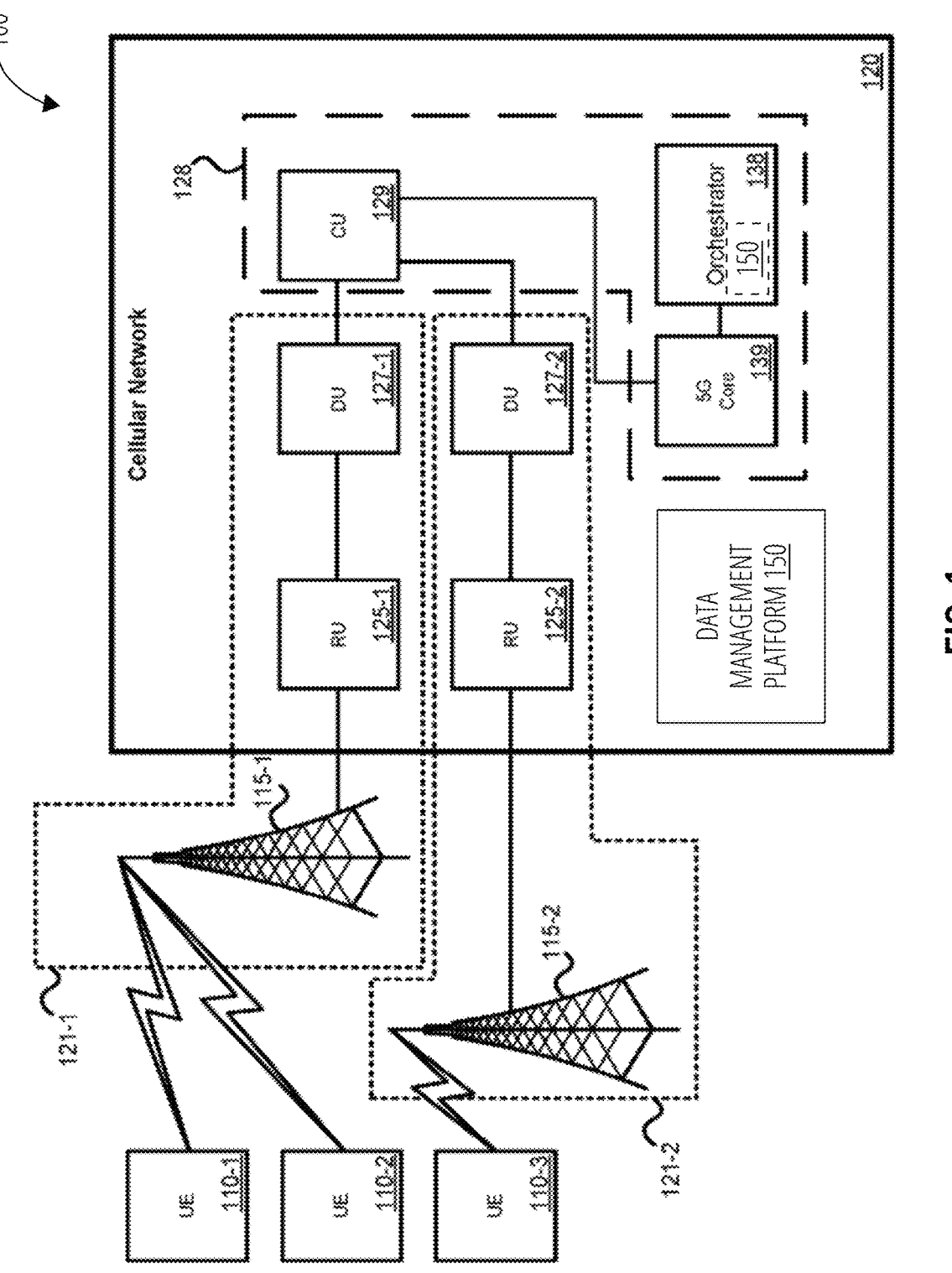
FIG. 1 is a block diagram of a system implementing a data management platform in a cellular network according to at least one embodiment.

As discussed above, as communication technologies advance, including the emergence of fifth generation (5G) new radio (NR) cellular networks, the data needs to be easily accessible, visible securely and of good quality for a developer to develop utilities, applications, solutions, pipelines, etc., for the data of the cellular network. As cellular networks scale, the data management at scale becomes challenging. In 5G NR cellular networks, there is a lot of disaggregated and distributed network components across a business of a network operator. There is overhead with the diverse data being published and the diversity and complexity of how the data comes to the network operator. The format of the data is different, and the tools used to support these different formats are different. So, when it comes to making use of the data from an observability perspective, such as the use case where the network operator wants to make sure that the network is operationally fit. This does not just include monitoring a status, such as a red or green status, but monitoring trends in progress of the status, such as the red or green status is fading away. There is a lot of overhead needed to process, clean, and format the data to get the data to a place where the network operator can use it.

Also, as described above, identifying network performance irregularities and predicting usage patterns are key to maintaining service quality and customer satisfaction. Analyzing customer behavior through data analysis helps optimize network operations with Standardized Design and Architecture for a competitive edge. However, conventionally, there are no mechanisms for proactively identifying network performance irregularities and predicting usage patterns, especially at scale.

Aspects and embodiments of the present disclosure overcome these deficiencies and others by providing a data management platform (DMP), from a subscriber perspective, that puts additional components in a network design itself to efficiently and uniformly deliver data from disparate data sources for observability purposes. The DMP can be an abstraction layer that can provide observability of the data to any subscriber, such as a network operator or anyone that wants to use the data to build any kind of services, which includes, but not limited to, machine learning (ML) and artificial intelligence (AI) services to provide value-added services on the telecommunications network. The DMP can provide a single pane (i.e., a singulare comprehensive view) of data from a cellular network through a data catalog. The single pane can allow a subscriber to view and consume the data, but not necessarily access the data sources of the data, as the connections to the data sources can be isolated (i.e., siloed) from the subscribers. The DMP can include a crawler that can collect data or metadata associated with the data from the different data sources in the cellular network. The DMP can obtain knowledge about the data in the cellular network at the abstraction layer and provide access, manage access, provide classification, manage maturity of the data, etc., from that point forward beyond the abstraction layer.

The collected data can include telemetry data. Telemetry data in a cellular network refers to real-time operational data or non-real time operational data from network components (such as base stations, routers, antennas, and user devices). The telemetry data allows network operators to monitor, analyze, and/or optimize the performance of the network. The telemetry data can include Fault, Configuration, Accounting, Performance, and Security (FCAPS) data. Alternatively, the telemetry data can include network performance metrics, such as network performance key performance indicators (KPIs). The network performance metrics can be data about signal strength, bandwidth usage, latency, jitter, packet loss, or the like. The network performance metrics can be used to assess and resolve issues with Quality of Service (QOS). The telemetry data can include device status and health information about the functioning of network equipment like base stations, including central processing unit (CPU) usage, memory, and power levels, enabling proactive maintenance and fault detection. The telemetry data can include user activity data, including metrics such as call durations, data consumption, and mobility patterns. The user activity data can be analyzed to improve service coverage and manage traffic loads. The telemetry data can include Radio Environment Data, such as information about spectrum usage, interference levels, and radio signal conditions to optimize frequency allocation and enhance signal quality.

Previously, use cases where a network operator wants to address dropped calls for a call retainability purpose, a first team would go directly connect to the data source, assess some details, and determine an answer for the drop calls, and then the team would do something about the dropped calls.

This is called a pointed solution because the team connects directly to the data sources. These pointed solutions are monolithic solutions. Then, a second team comes in and does the same thing at a later point; once again connecting directly to the data source to evaluate the data. The work done by the second team would overlap the work done by the first team. The teams just keep repeating work. This is because of the invisibility of the data being already used or graded or qualified (i.e., matured to a certain quality level). Aspects and embodiments of the present disclosure can provide an abstraction layer that abstracts the data using a data catalog that allows any subscriber to develop services on top of the abstraction layer that do not depend on direct connections to the data sources themselves. Rather, the abstraction layer can provide observability into the data of the network, while providing the ability of modernization of tools (e.g., ML/AI services) for value-added services that use the underlying data from the network. This is especially valuable in NR cellular networks, like 5G and 6G.

Aspects and embodiments of the present disclosure can classify the data of a cellular network according to tiers, such as first tier data and second tier data. The latency for tiering is dictated by the use cases and the needs of the reporting for specific use cases, such as network operations center (NOC), an artificial intelligence (AI) application, or the like. For example, inter cell handover mobility requires a latency in milliseconds, whereas a NOC may require a latency in minutes. The first tier data and the second tier data can be distinguished based on location, time, aggregation levels (i.e., granularity). The first tier data can be data located at an edge location, an end-node location, a User Equipment (UE) location, have a latency of microseconds to a second, closest to the network elements, hyper-distributed and disaggregated like the network architecture, and can have a lowest granularity. The first tier data can be consumed and published per the standards from governing bodies and can be raw data. Second tier data can be aggregated data located at points of aggregation in the cellular network, have a latency of seconds to tens of seconds, etc. The second tier data can be aggregated in a location that is not in the same instance of the corresponding network component. The second tier data should be consumed and published per standards; although there are not standards today on this area of data. In other embodiments, additional tiers of data can exist and differentiated based on similar attributes of the data. Different use cases can use different tiers of data or even multiple tiers of data.

Aspects and embodiments of the data management platform can provide an efficient and automatic way to identify data from various sources, process large scale data, assess data quality of the data based on a set of rules, identify, and improve data with low quality (not satisfying one or more rules).

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or causes the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the method can include collecting, using a DMP executed by a computing system, telemetry data from a plurality of different data sources in different network domains in a cellular network, and storing the telemetry data in an object store associated with one or more sources associated with an application, the telemetry data comprising first tier data and second tier data. The first tier data comprises first data collected at a user equipment (UE) location, an edge location, or an end-node location, and has a first range of latency values. The second tier data comprises second data aggregated from the plurality of different data sources and has a second range of latency values, the second range having higher latency values than the first range. The method can further include generating, using a crawler, a data catalog from the telemetry data stored in the object store by automatically discovering, indexing, and cataloging the first data and the second data from the plurality of different data sources in the different network domains. The method can further include receiving a request from a subscriber service to provide visibility of at least the first tier data or the second tier data. The DMP isolates connections to the plurality of different data sources from the subscriber service. The method can further include presenting, by the computing system, a graphical user interface (GUI) with real-time updates of geospatial information of the at least one of the first tier data or the second tier data in a singular comprehensive view.

In some implementations, the computing system is a cloud computing system, and the data management platform is implemented in the cloud computing system.

Particular implementations of the subject matter described in this disclosure can be implemented so as to realize one or more of the following advantages. By providing the data management platform, the technologies described herein can enhance efficiency of data processing, reduce latency and cost of data analysis, and improve data accuracy and consistency for applications, which can lead to informed decision-making and an improved user experience.

FIG. 1 is a block diagram of a cellular network system 100 ("system 100") implementing a data management platform 150 (also referred to as DMP 150) in a cellular network according to at least one embodiment. FIG. 1 represents an embodiment of a cellular network that can accommodate a cloud-based architecture. System 100 can include a 5G New Radio (NR) cellular network; other types of cellular networks, such as 6G, 7G, etc., may also be possible. System 100 can include: UEs 110 (UE 110-1, UE 110-2, UE 110-3); base station structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), because components can be implemented as specialized software executed on general-purpose hardware, except for components that need to receive and transmit radio frequency (RF), the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on their individual locations, UE 110 may use RF to communicate with various base stations of cellular network 120. As illustrated, two base stations are illustrated: base station 121-1 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other human-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. Structure 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the Citizens Broadband Radio Service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software executed by general-purpose computing equipment, such as in a data center of a cloud-computing platform, as detailed herein. Therefore, depending on needs, the functionality of a CU and/or 5G core may be implemented locally to each other, and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic substantially increases in a region, an additional logical CU or components of a CU may be deployed in a data center near where the traffic is occurring without any new hardware being deployed. (Instead, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., Helm charts); creating Kubernetes nodes/ pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the quality of service (QOS) and quality of experience (QoE) for UEs can be varied across different slices. A network slice can be configured to provide sufficient resources for a particular application to be properly executed and delivered (e.g., gaming services, video services, voice services, location services, sensor reporting services, data services, etc.). However, resources are not infinite, so allocating an excess of resources to a particular UE group and/or application may be desired to be avoided. Furthermore, a cost may be attached to cellular slices: the greater the amount of dedicated resources, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components but also their ability to respond to changing network conditions and meet or exceed vendor specifications, significant testing must be performed.

5G core 139, which can be physically distributed across data centers or located at a central national data center (NDC), can perform various core functions of the cellular network. 5G core 139 can include: network resource management components; policy management components; subscriber management components; and packet control components. Individual components may communicate on a bus, allowing various components of 5G core 139 to communicate directly with each other. 5G core 139 is simplified to show some key components. Implementations can involve additional other components.

Network resource management components can include a network repository function (NRF) and a network slice selection function (NSSF). NRF can allow 5G network functions (NFs) to register and discover each other via a standards-based application programming interface (API). NSSF can be used by an access and mobility management function (AMF) to assist with the selection of a network slice that will serve a particular UE.

Policy management components can include a charging function (CHF) and a policy control function (PCF). The CHF allows charging services to be offered to authorized network functions. Converged online and offline charging can be supported. PCF allows for policy control functions and the related 5G signaling interfaces to be supported.

Subscriber management components can include unified data management (UDM) and an authentication server function (AUSF). The UDM can allow for generation of authentication vectors, user identification handling, NF registration management, and retrieval of UE individual subscription data for slice selection. The AUSF performs authentication with a UE.

Packet control components can include an access and mobility management function (AMF) and a session management function (SMF). The AMF receives connection- and session-related information from a UE and is responsible for handling connection and mobility management tasks. The SMF is responsible for interacting with the decoupled data plane, creating, updating, and removing protocol data unit (PDU) sessions, and managing session context with the user plane function (UPF).

A User Plane Function (UPF) can be responsible for packet routing and forwarding, packet inspection, QoS handling, and external PDU sessions for interconnecting with a data network (DN) (e.g., the Internet) or various access networks. Access networks can include the RAN of cellular network 120.

The 5G core 139 may reside on a cloud computing platform. While from a client's or user's point of view, the "cloud" can be envisioned as an ephemeral computing workspace that occupies no physical space, in reality, a cloud computing platform is an interconnected group of data centers through which computing and storage resources are spread. Therefore, data centers may be scattered geographically and can provide redundancy.

As illustrated in FIG. 1, the system 100 includes a data management platform 150. The data management platform 150 is a system or suite of tools and technologies designed to manage, store, process, analyze, and/or visualize large volumes of data. The data management platform 150 can be used by modern data-driven organizations, enabling them to harness the power of their data for various purposes, such as business intelligence, analytics, machine learning, and more. In general, the data management platform 150 includes components for data ingestion, data storage, data processing, data management, data integration, data analytics, machine learning (ML) and artificial intelligence (AI) platforms, data security, or the like. For example, a data ingestion component can use extract, transform, load (ETL) logic (tools or processes) that extracts data from various sources, transforms it into a suitable format, and loads it into a storage system. The data ingestion component can be set up to stream real-time data from sources, such as Internet of Things (IoT) devices, transactional systems, or other network functions. The data management platform 150 can include data storage components, such as data lakes, data warehouses, and database systems. Data lakes are large storage repositories that hold raw data in its native format until it is needed. Data warehouses are structured storage systems optimized for query performance and analytics, often storing cleaned and processed data. Database systems can include both relational (e.g., SQL) and non-relational (e.g., NoSQL) databases for various data storage needs. The data processing components can handle batch processing, streaming processing, or the like. Batch processing can handle large volumes of data in batches, typically for tasks like reporting, data transformation, and aggregation. Stream processing can handle real-time processing of continuous data streams to support applications like real-time analytics and monitoring. Data management components can handle metadata management and data governance. The metadata management can include tools for managing metadata, which is data about data, including data catalogs, lineage, and governance. Data governance can include policies and processes to ensure data quality, security, privacy, and compliance with regulations. Data integration components can provide application programming interfaces (APIs), data virtualization, etc. The APIs can be used for accessing and integrating data across different systems. Data virtualization techniques can be used for abstracting and integrating data from various sources without moving it physically. The data analytics components can have Business Intelligence (BI) and advanced analytics tools and platforms for data reporting, visualization, and dashboards to support decision-making. Advanced analytics techniques, like data mining, predictive analytics, and statistical analysis, can be used to derive deeper insights. The ML/AI platforms can provide a model training platform for developing and training machine learning models using data stored in the platform, and a model deployment platform for deploying trained models into production environments for real-time or batch inference. Data security components can provide access control, encryption, etc. Access control mechanisms can be used for ensuring that only authorized users can access specific data. Encryption techniques can be used for protecting data both at rest and in transit to prevent unauthorized access and breaches. The data management platform 150 can consolidate data from various sources into a single platform, making it easier to manage and access. The data management platform 150 can supports large-scale data storage and processing, accommodating growing data volumes and increasing complexity. The data management platform 150 can enable real-time data processing and analytics, allowing organizations to respond quickly to changing conditions. The data management platform 150 can facilitate collaboration across different departments and teams by providing a unified data environment. The data management platform 150 can implement data governance and quality control measures to ensure the accuracy and reliability of data. The data management platform 150 can provide organizations with the tools and insights needed to make informed, data-driven decisions. In summary, the data management platform 150 can provide the infrastructure and tools needed to manage, process, and analyze data effectively, enabling organizations to unlock the full potential of their data assets. The data management platform 150 can also provide business intelligence and reporting. The data management platform 150 can aggregate data from multiple sources to generate comprehensive reports and dashboards for business analysis. The data management platform 150 can provide real-time analytics. In particular, the data management platform 150 can monitor and analyze data streams in real-time to gain immediate insights and drive instant actions. The data management platform 150 can provide customer insights by analyzing customer data to understand behavior patterns, preferences, and trends to improve customer experience and loyalty. The data management platform 150 can implement predictive maintenance as well, such as using machine learning models to predict equipment failures and schedule proactive maintenance in industries like manufacturing and utilities.

As described herein, the data management platform 150 can be implemented in a cloud computing system, providing data storage, data warehousing, real-time data processing, analytic engines for large-scale data processing, ML/AI services, data flow for stream and batch processing, or other data services. As described in more detail below, the data management platform 150 can be executed by a computing system. The data management platform 150 can collect telemetry data from a plurality of different data sources in different network domains in a cellular network. The telemetry data can include FCAPS data, as described herein. The data management platform 150 can store the telemetry data in an object store associated with one or more sources associated with an application. The telemetry data can include first tier data and second tier data. The first tier data includes first data collected at a user equipment (UE) location, an edge location, or an end-node location, and has a first range of latency values. The first range of latency values can be microseconds up to a second in latency. The latency can include the amount of time to collect and/or additional time to aggregate or determine an insight locally about the collected data. The second tier data includes second data aggregated from the plurality of different data sources and has a second range of latency values, the second range having higher latency values than the first range. The second range of latency values can be a second up to tens of seconds. The latency can include the amount of time to collect and/or additional time to aggregate or determine an insight locally about the collected data.

Figure 2:
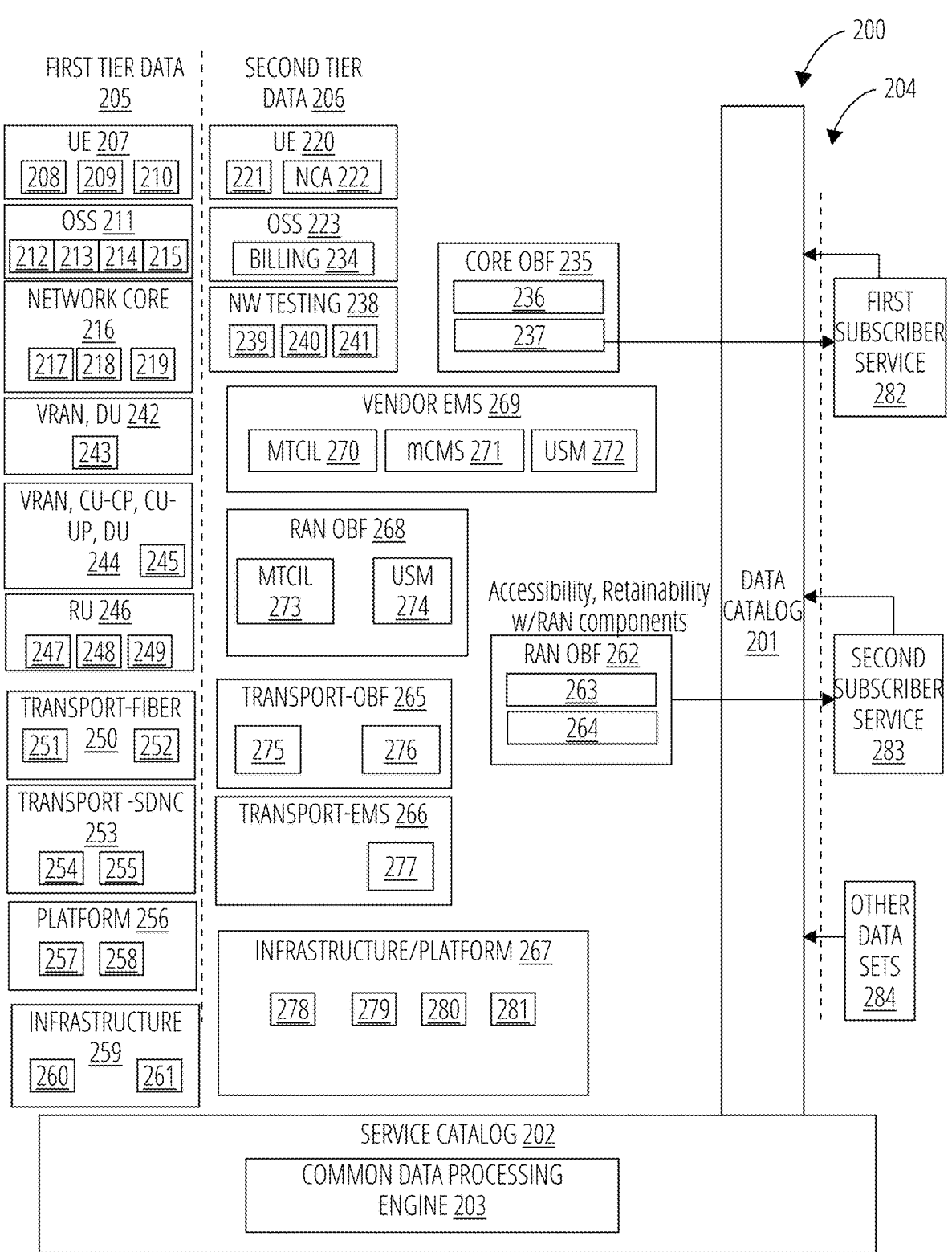
FIG. 2 is a block diagram illustrating an architecture of a data management platform according to at least one embodiment.

In other embodiments, additional tiers of data can be defined and distinguished based on location, time, aggregation levels (i.e., granularity). The data management platform 150 can generate, using a crawler, a data catalog from the telemetry data stored in the object store by automatically discovering, indexing, and cataloging the first data and the second data from the plurality of different data sources in the different network domains. The data management platform 150 can receive a request from a subscriber service to provide visibility of at least the first tier data or the second tier data. It should be noted that the data management platform 150 isolates connections to the plurality of different data sources from the subscriber service. The data management platform 150 presents a GUI with real-time updates of geospatial information of the at least one of the first tier data or the second tier data in a singular comprehensive view. Additional details of the data management platform 150 are described below with respect to FIG. 2. FIG. 2 provides an overview of data processing activities in an ORAN environment.

FIG. 2 is a block diagram illustrating an architecture of a data management platform 200 according to at least one embodiment. The data management platform 200 (also referred to as DMP 200) can be the data management platform 150 of FIG. 1. The data management platform 200 can be executed by a computing system, such as a cloud computing system. The data management platform 200 can collect from different data sources in different network domains in a cellular network. For example, the different domains can include data sources in UE domains, Operational Support Systems (OSS) domains, a network core (e.g., 5G core or 5GC) domain, a network testing domain, an Order and Billing Function (OBF) domain in a network core, a virtual RAN (vRAN) DU domain, an Element Management Systems (EMS) domain, a vRAN CU domain, a RAN OBF, a transport domain, a transport Software-Defined Network Controller (SDNC) domain, a transport OBF domain, a transport EMS domain, a platform domain, an infrastructure domain, etc. An example set of data sources in these various domains is illustrated in FIG. 2. However, in other embodiments, the data management platform 200 can collect data from other data sources than those illustrated and described with respect to FIG. 2.

As described herein, the collected data can be telemetry data. The telemetry data can include Fault, Configuration, Accounting, Performance, and Security (FCAPS) data. The telemetry data can include network performance, faults, and logs data. The telemetry data can be classified or otherwise categorized into multiple tiers, such as first tier data 205 and second tier data 206, as illustrated in FIG. 2. It should be noted that the telemetry data can be data or metadata associated with data.

The data management platform 200 can include first tier data 205 from various sources in the cellular network. In at least one embodiment, the first tier data 205 includes first data collected at a UE location, an edge location, or an end-node location. The various locations can be from different vendor solutions in the cellular network, such as devices or solutions from Original Equipment Manufacturers (OEMs) or Original Design Manufacturers (e.g., Apple, Samsung, Google, Motorola, Celero, Tinno, Wingtech, Coosea, or the like). The first tier data 205 has a first range of latency values. The first range of latency values can be the lowest range. The first range of latency values can correspond to data with the lowest latency requirements. The first range of latency values can be microseconds up to a second in latency. The latency can include the amount of time to collect and/or additional time to aggregate or determine an insight locally about the collected data. The first tier data 205 can be data and intelligence data (insights) that are closer to the network elements. The data can be consumed or published per standards. The first tier data 205 can be hyper-distributed and disaggregated, like the network architecture. The first tier data 205 can be at the lowest grain (or granularity) and raw. The first tier data 205 should be published according to standards from governing bodies. For identification and accessibility of first tier data 205 from essential data-intensive services, such as Voice over New Radio (VoNR), Short Message Service (SMS), Multimedia Messaging Service (MMS), or other data accessibility services, it is important to collect and process first tier data 205 quicker than other tiers of data. These services are two-way communications. The device has the capability to perform VoNR, SMS, MMS, and browsing data, relying on simultaneous data processing on both the RAN and Core (Network) sides. The 5G network has two main components: the 5G Core (5GC) and the Radio Access Network (RAN). The 5G Core serves as the control center of the network, managing protocols, network interfaces, and services. It encompasses cellular telecommunications technologies, including radio access, core network, and service capabilities. Within the mobile network, the 5G core handles various functions such as mobility management, authentication, authorization, data management, policy management, and quality of service (QOS) for end users. Open RAN is a new approach to constructing 5G mobile networks. It aims to reduce deployment costs, simplify operations, and accelerate the rollout of new features. Open RAN breaks down the traditional RAN into three components: the radio unit (RU), distributed unit (DU), and centralized unit (CU). This allows service providers to use equipment from different vendors, opening up interfaces inside the base station. Open RAN also facilitates interoperability and the mixing and matching of components.

The second tier data 206 can include second data aggregated from the different data sources and has a second range of latency values, with the second range having higher latency values than the first range. The second range of latency values can be a second up to tens of seconds in latency. The latency can include the amount of time to collect and/or additional time to aggregate or determine an insight locally about the collected data. In other embodiments, additional tiers of data can be defined and distinguished based on location, time, aggregation levels (i.e., granularity). The second tier data 206 can be data that is used for recognizing and addressing network issues and discrepancies and promptly reporting any device-related problems to OEMs. The second tier data 206 can be used for network performance analysis. For example, the second tier data 206 can be used for analyzing key performance indicators (KPIs). The second tier data 206 can focus on Voice Quality KPIs, such as a Mean Opinion Score (MOS), a Data Accessibility KPI, a Call Retainability KPI, or the like. The second tier data 206 can be used for identifying network performance anomalies and forecasting load. The second tier data 206 can be used to analyze Customer Behavior Analysis, such as utilizing data to analyze customer behavior, understanding the impact of network performance on customer satisfaction, leveraging customer behavior insights for long-term advantages, or the like. The second tier data 206 can be used for Network Optimization Strategies, such as identifying areas for improvement based on data analysis, implementing solutions for addressing network issues, and achieving long-term benefits and a competitive edge through efficient network operations. To achieve the timeliness of reporting information, the second tier data 206 can involve the aggregation and processing of raw data (insights or intelligence processing) with latency between seconds to tens of seconds. The second tier data 206, including the data and/or insights, is not necessarily in the same instance as the network element. The second tier data 206 should be published and consumed according to a standard. Currently, however, there are no standards on the publishing and consuming of this type of data.

The latency for tiering can be dictated by the use cases and the needs of the reporting for a given application, such as a network optimization application, a Network Operations Center (NOC), an artificial intelligence (AI) application, a machine learning (ML) application, a deep learning (DL) application, or other consuming applications. For example, inter-cell handover mobility requires reporting in milliseconds, whereas a NOC may require reporting in minutes.

As illustrated in FIG. 2, the first tier data 205 can include telemetry data from a UE 207 domain, such as data collected from an OEM 208, devices 209, phones 210, etc. The first tier data 205 can include telemetry data collected from an OSS 211 domain, such as data collected from a framework 212 (e.g., Autonomous Network Infrastructure 2.0 (ANI 2.0)), a network core component 213 (e.g., Charging Function (CHF)), a digital commerce platform 214 (e.g., Matrixx Software), a routing and service orchestrator 215 (e.g., DigiRoute), or the like.

The first tier data 205 can include telemetry data collected from a network core 216 domain, such as data collected from a core network function 217 (e.g., Oracle network function), a network visibility and monitoring solution 218 (e.g., Radom solution), a cloud-native core network function 219 (e.g., a Nokia solution such as NetAct), or the like.

The first tier data 205 can include telemetry data collected from a vRAN, DU 242 domain, such as data collected from a vRAN solution 243 (e.g., Mavenir solutions, such as XA, SYCLLA, SMSC, XMS, VVM, VMA, MMSC), or the like.

The first tier data 205 can include telemetry data collected from a vRAN, CU-CP, CU-UP, DU 244 domain, such as data collected from a vRAN solution 245 (e.g., Altiostart (iR-MAs, sDaaS)), or the like.

The first tier data 205 can include telemetry data collected from an RU 246 domain, such as data collected from a wireless backhaul solution 247 (e.g., Ceragon solution), a RAN solution 248 (e.g., Fujitsu solution), a RAN solution 249 (e.g., a Samsung solution), or the like.

The first tier data 205 can include telemetry data collected from a transport-fiber 250 domain, such as data collected from a fiber optic infrastructure service 251 (e.g., Lit Fiber solution), a Dark Fiber service 252 (e.g., Zayo Dark Fiber solution), or the like.

The first tier data 205 can include telemetry data collected from a transport-software-defined network controller 253 domain, such as data collected from a virtual router 254 (e.g., CSR), an SDNC solution 255 (e.g., Cisco solutions such as Workflow Engine, Ztx, NBO, TAF, UI, CDG, CNC, SR-PCE), or the like.

The first tier data 205 can include telemetry data collected from a platform 256 domain, such as data collected from a platform 256 (e.g., VMWare platform), a virtualization and cloud computing solution 257 (e.g., Wind River solution), or the like.

The first tier data 205 can include telemetry data collected from an infrastructure 259 domain, such as data collected from a cloud service provider 260 (e.g., Amazon AWS provider), an On-Premises infrastructure 261, or the like.

As illustrated in FIG. 2, the second tier data 206 can include telemetry data (and possibly aggregated data) from a UE 220 domain, such as data collected from a third-party test data 221, a Network Control and Automation (NCA) 222, or the like.

The second tier data 206 can include telemetry data (and possibly aggregated data) from a UE 220 domain, such as data collected from a third-party test data 221, a Network Control and Automation (NCA) 222, or the like.

The second tier data 206 can include telemetry data (and possibly aggregated data) from an OSS 223 domain, such as data collected from a billing solution 234, or the like.

The second tier data 206 can include telemetry data (and possibly aggregated data) from a core OBF 235 domain, such as data collected from an ordering and billing function 236 (e.g., Innoeye solution), a network visibility and monitoring solution 237 (e.g., Radom solution), or the like.

The second tier data 206 can include telemetry data (and possibly aggregated data) from a NW testing 238 domain, such as a testing, measurement, and validation solution 239 (e.g., Keysight solution), a Radio Network Subsystem (RNS) 240 (e.g., RNS), a testing, assurance, and analytics solution 241 (e.g., Spirent), or the like.

The second tier data 206 can include telemetry data (and possibly aggregated data) from a vendor EMS 269 domain, such as data collected from a Managed Transport and Core Infrastructure Layer 270 (e.g., Mavenir solution such as MTCIL), a Mobile Content Management System 271 (e.g., Mavenir solution such as mCMS), a Unified Service Management 272 (e.g., Samsung solution such as Unified Service Management (USM)), or the like.

The second tier data 206 can include telemetry data (and possibly aggregated data) from a RAN OBF 268 domain, such as an MTCIL 273, or a USM 274, or the like.

The second tier data 206 can include telemetry data (and possibly aggregated data) from a RAN OBF 262 domain, such as a tool 263 (e.g., Station solution), an ordering and billing function 264 (e.g., Innoeye solution), or the like.

The second tier data 206 can include telemetry data (and possibly aggregated data) from a transport-OBF 265 domain, such as a real-time digital commerce platform 275 (e.g., Cisco-Matrix), a real-time analytic platform 276 (e.g., Cisco-Vitria), or the like.

The second tier data 206 can include telemetry data (and possibly aggregated data) from a transport-EMS 266 domain, such as a ticketing system 277 (e.g., Netcracker TT), or the like.

The second tier data 206 can include telemetry data (and possibly aggregated data) from an infrastructure/platform 267 domain, such as a monitoring and observability service 278 (e.g., Cloudwatch), a containerized service manager 279 (e.g., VNWare TSA (, a policy-as-code framework 280 (e.g., Sentinel), a Continuous Integration/Continuous Delivery or Deployment (CICD) pipeline 281, or the like.

In other embodiments, additional tiers can be defined in a similar manner as the first tier data 205 and the second tier data 206.

In at least one embodiment, the data management platform 200 can collect the telemetry data and store the telemetry data in an object store (illustrated in FIG. 5) associated with one or more sources associated with an application. In at least one embodiment, the application can be a business-domain-specific application. As described herein, the telemetry data includes both first tier data 205 and second tier data 206. In at least one embodiment, the object store can be associated with a cloud account, such as within a private subnet of a virtual private cloud (VPC) associated with a device account.

In at least one embodiment, the data management platform 200 uses a crawler on the telemetry data stored in the object store to generate a data catalog 201. The crawler can automatically discover, indexing, and catalog the first tier data 205 and second tier data 206 from the different data sources in the different network domains. As described above, the first tier data 205 can include first data collected at a UE location, an edge location, or an end-node location, and has a first range of latency values. The second tier data 206 can include second data aggregated from the different data sources and has a second range of latency values, the second range having higher latency values than the first range.

In at least one embodiment, the data catalog 201 can make data at all tiers visible for several subscribers. The data catalog 201 can avoid siloed connections to the sources of data. In fact, the data catalog 201 causes that there are no siloed connections to the data sources. The data catalog 201 can provide a uniform data glossary, manage data access, and data classification. The service catalog 202 can provide additional functionality to collect and provide data to various subscribers using the data catalog 201.

In at least one embodiment, the first subscriber service 282 can request information from the network visibility and monitoring solution 237 in the core OBF 235 domain. The first subscriber service 282 can be a specific application for analyzing packet data for both UPFD and UPFV, as well as analyze traces. The first subscriber service 282 can use the collected information via the data catalog 201 in various ways for various purposes. The other data sets 284 can be collected information via the data catalog 201 for a different purpose, such as analyzing dropped calls, quality of VoNR, data accessibility, MMS, SMS delivery, or the like.

In other embodiments, the data catalog 201 can ingest data from other data sets 284. The data from the other data sets 284 can originate from other locations than those described as the first tier data 205 and the second tier data 206.

The data catalog 201 can unlock substantial improvements with enhanced cross-functional visibility, data-driven analysis, and informed decision-making by: 1) seamlessly consolidating insights from diverse data sources into layers (tiers) within a unified platform; 2) displaying real-time updates of geospatial information in a singular comprehensive view; and 3) gaining a holistic 360-degree view of service performance. The data catalog 201 can be used to help retain existing subscribers by emphasizing customer satisfaction and competitive advantage through improved network efficiency. The data catalog 201 can help minimize the time spent on analyzing and addressing service performance issues. The data catalog 201 can help streamline the process of resolving customer complaints and issues. The data catalog 201 can help speed up network optimization and expansion to elevate service-level KPIs, including tickets and resolution time. The data catalog 201 can help exceed customer satisfaction (CSAT, NPS) and achieve customer excellence. The data catalog 201 can be used to provide a Customer-centric versus Network-centric design. The data catalog 201 can be used to provide Insights versus Data to drive decisions and actions. The data catalog 201 can include common reusable and scalable toolsets and technologies (e.g., Reporting, Mapping tool). The data catalog 201 can provide integration and normalization across different data sources. The data catalog 201 can provide continuous and right-time intelligence.

In at least one embodiment, the data catalog 201 can receive a request from a subscriber service, such as a first subscriber service 282 or a second subscriber service 283, to provide visibility of at least the first tier data 205 or the second tier data 206. The data catalog 201 can provide isolation between the subscriber services and the underlying data sources. That is, the data management platform 200, using the data catalog 201, can isolate connections to the different data sources from the subscriber services (e.g., first subscriber service 282, second subscriber service 283). In response to the request, the data management platform 200 can determine one or more insights of network performance irregularities or usage patterns associated with an account across the different network domains in a region of the cellular network. The data management platform 200 can determine the real-time updates of geospatial information based on the one or more insights. In response to the request, the data management platform 200 can present a graphical user interface (GUI) with real-time updates of geospatial information of the at least one of the first tier data 205 or the second tier data 206 in a singular comprehensive view 204 (also referred to as a single-pane of glass). The singular comprehensive view 204 of the GUI can consolidate the one or more insights of network performance irregularities or usage patterns from the plurality of data sources into layers (e.g., tiers within the different network domains) within a unified platform, namely the data management platform 200.

As described herein, the first tier data 205 and/or the second tier data 206 can include one or more insights of network performance irregularities or usage patterns associated with an account across the different network domains in a region of the cellular network. The real-time updates of geospatial information can be based on the one or more insights. The real-time updates of geospatial information and/or the one or more insights of network performance irregularities or usage patterns can be based on one or more network key performance indicators (KPIs) associated with an account. The one or more KPIs can include a Mean Opinion Score (MOS), a Data Accessibility KPI, a Call Retainability KPI, or the like.

In at least one embodiment, the KPIs can include a voice quality KPI. The voice quality KPI can be determined based on at least one of: call result information including a success, a failure with cause, or a drop; call setup time versus iteration; a Mean Opinion Score (MOS) versus interaction; a handover success rate; or a handover latency.

In at least one embodiment, the KPIs can include a video quality KPI. The video quality KPI can be determined based on at least one of: a bitrate; a buffer duration; a buffer rate; a resolution; a number of frames dropped; lag length; or video startup time.

In at least one embodiment, the KPIs can include a network performance KPI. The network performance KPI can be determined based on at least one of: a frequency band; downstream bandwidth; upstream bandwidth; latency; or a ping duration.

These KPIs can be determined using other types of collected data. Also, the KPIs can include other types of KPIs and other underlying data. In at least one embodiment, one of the KPIs can be a VoNR Quality KPI.

In at least one embodiment, the data catalog 201 can also store call information, device information, geolocation information, serving cell information, and Subscriber Identity/Identification Module (SIM) information. The call information can include at least one of a device identifier, an Original Equipment Manufacturer (OEM) name, a device model name, a software version of a device model, a Network Capability Awareness (NCA) version, or a Forced Roaming status. The device information can include at least one or more of an operating system (OS) name, an OS version, a release number, the device identifier, the device model name, a product identifier, a brand identifier, a display identifier, a hardware identifier, a manufacturer identifier, a serial number, a user identifier, or a host identifier. The geolocation information can include at least one of latitude/longitude coordinates, a Global Positioning System (GPS) status, a cell identity, a Physical Cell Identifier (PCI), a Tracking Area Code (TAC), a Mobile Country Code (MCC), a Mobile Network Code (MNC), a Radio Access Technology (RAT), a band identifier, an Absolute Radio Frequency Channel Number (ARFCN), a Reference Signal Received Power (RSRP), a Reference Signal Received Quality (RSRQ), a Signal to Interference plus Noise Ratio (SINR), or a Signal Strength. The SIM information can include at least one of a SIM country code, a SIM network code, or a SIM operator name.

It should be noted that the data can be collected from varied sources by varied methods and in varied formats. The data catalog 201 can bring this data into a format that makes it usable. The data is available at all tiers and stages of its collection and processing by the data catalog 201. The subscribers, such as applications, can access the data at all stages to determine KPIs. In some cases, KPIs can be computed and accessed by the subscribers via the data catalog 201, as well.

In at least one embodiment, the data management platform 200 can provide a tool for customer-centric voice and data analysis, focusing on building a singular comprehensive view 204 for monitoring performance of users' devices, performance of the network, etc. The data collected and pushed to the nearest persistent data storage module can help create intelligent solutions. The data management platform 200 facilitates a standard for collecting KPIs and data pipelines. Given the level of data detail, the data management platform 200 can enable end-to-end correlations between various layers (tiers) and network domains of a cellular network. Given the openness of systems available in 5G and future generation telecommunications, the data management platform 200 can provide great value in managing data in the cellular network. The data management platform 200 manages the sharing of data to the masses in a governed and scalable self-service model.

In at least one embodiment, the data management platform 200 is executed by a computing system, such as a cloud computing system. In at least one embodiment, the object store resides in a private subnet of a virtual private cloud (VPC), the private subnet being associated with an account. In other embodiments, the data management platform 200 can be implemented in other locations associated with a cellular network.

As described above, the data catalog 201 can provide a singular comprehensive view 204 of collected data. As described in more detail below, the data catalog 201 can be used in connection with a service catalog 202. The service catalog 202 can store a common data processing engine 203 that is configured to ingest, process, store, and deliver telemetry data from a data source in the cellular network to one or more object stores. An example common data processing engine 203 is illustrated and described below with respect to FIG. 3. As described above, the data catalog 201 can use the crawler to automatically discover, index, and catalog the telemetry data (e.g., first tier data 205 and second tier data 206) from the different data sources in the different network domains. As described herein, the telemetry data can include FCAPS data. Alternatively, the telemetry data can include other data associated with the performance of devices and the cellular networks. The service catalog 202 can be used to deploy different copies or instances of the common data processing engine 203 at various network components or network functions. For example, the service catalog 202 can be used to deploy a first instance of the common data processing engine 203 at a first event manager associated with a first data source in a first network domain in the cellular network. The first event manager can include a first data subscriber that outputs first FCAPS data to an object store associated with an account. The service catalog 202 can be used to deploy a second instance of the common data processing engine 203 at a second event manager associated with a second data source in a second network domain in the cellular network, the second network domain being different than the first network domain. The second event manager can include a second data subscriber that outputs second FCAPS data to the object store associated with the account. Any function that processes data, collects data, or publishes data is recorded and monitored in the service catalog 202, whereas the results of the processing by the common data processing engine 203, for example, are data that are output to the data stores that are discovered, indexed, and made available via the data catalog 201 as described above. The data catalog 201 makes the data available for building KPIs and solutions that use these KPIs. The data catalog 201 and the service catalog 202 can be shared solutions that can be leveraged together to address the large amount of data generated in connection with the cellular network.

The data catalog 201 and the service catalog 202 allow management of data at various tiers, providing visibility to all the data and allowing for correlations and reporting across all the various network domains. This management of data resolves the issues of the network in an end-to-end manner.

Figure 3:
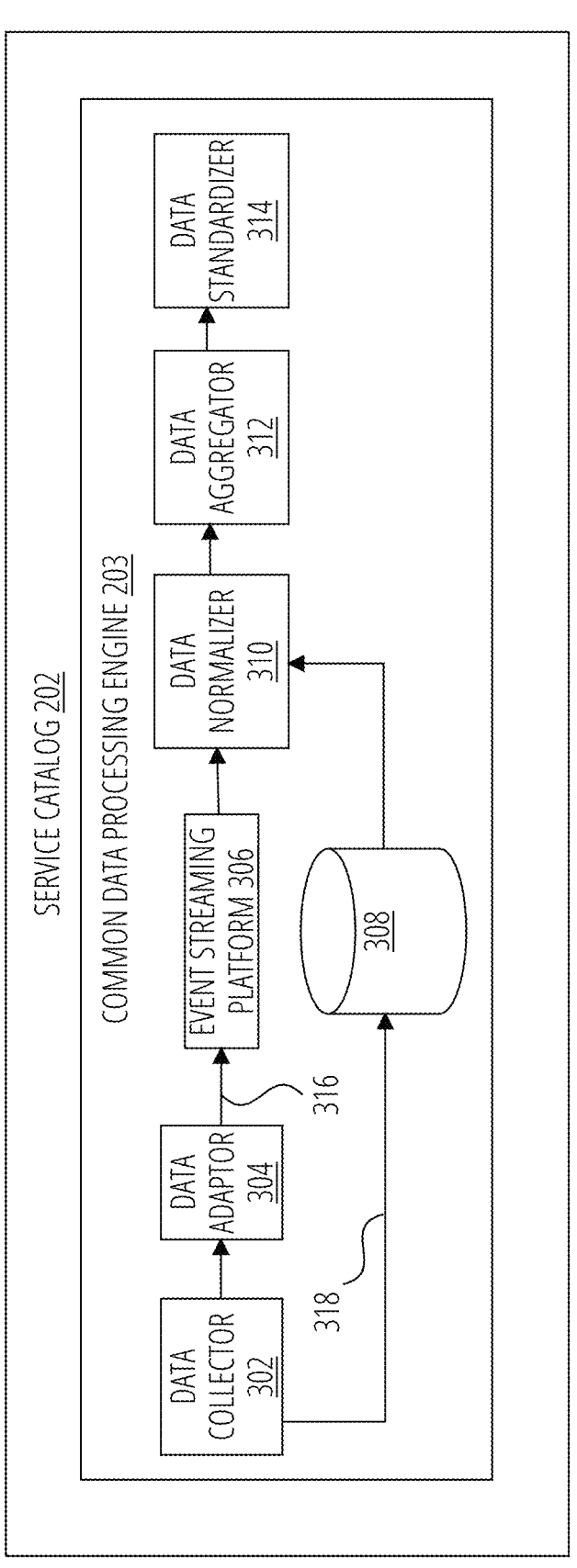
FIG. 3 is a block diagram of the service catalog with an example common data processing engine according to at least one embodiment.

FIG. 3 is a block diagram of the service catalog 202 with an example common data processing engine 203 according to at least one embodiment. The common data processing engine 203 includes a data collector 302, a data adaptor 304, an event streaming platform 306, a cloud-based storage unit 308, a data normalizer 310, a data aggregator 312, and a data standardizer 314. In at least one embodiment, the data collector 302 can collect one or more data logs 318 from a first data source. The data collector 302 can store the logs 318 in the cloud-based storage unit 308. The cloud-based storage unit 308 can be a storage unit in a storage service, such as the Amazon Web Services (AWS) Simple Storage Service (S3) bucket. The data adaptor 304 can receive data logs 318 (or just data) from the data collector 302 and generate one or more messages based on the one or more data logs. The one or more messages can be alarms 316, for example. The one or more messages can be topics, event data, or the like. The event streaming platform 306 can receive the one or more messages (e.g., alarms 316) from the data adaptor 304. The event streaming platform 306 can publish the one or more messages. The event streaming platform 306 can be, for example, an Apache Kafka bus. The data normalizer 310 can receive events from the event streaming platform 306 and/or access data logs 318 stored in the cloud-based storage unit 308. The data normalizer 310 can generate normalized data from the one or more data logs from the cloud-based storage unit 308 and the one or more messages from the event streaming platform 306. The data aggregator 312 can generate aggregated data from the normalized data. The data standardizer 314 can generate standardized data from the aggregated data. The FCAPS data, collected and processed by the common data processing engine 203, can include the standardized data output by the data standardizer 314. For example, the output of the particular instance of the common data processing engine 203 can store the standardized data, collected and processed, from the first data source in the object store described above. The data catalog 201 can automatically discover and index the normalized data for providing visibility into the normalized data.

In one example, a developer can be given a requirement to be able to ingest data from an event streaming platform 306 (e.g., Apache Kafka bus) and a cloud-based storage unit 308 (e.g., S3 bucket). Kafka is an open-source distributed event streaming platform developed by the Apache Software Foundation. It is designed for high-throughput, low-latency data streaming and is used to build real-time data pipelines and streaming applications. Kafka is capable of handling trillions of events per day and supports features such as message publishing and subscribing, fault tolerance, scalability, and distributed storage. It can be used for log aggregation, real-time analytics, and event sourcing. The S3 bucket is a fundamental storage unit that is used to store and manage data objects, which can include files, images, videos, and backups. Each bucket is uniquely identified by a key and can hold an unlimited amount of data. Features of S3 buckets include versioning, access controls, lifecycle policies for data archiving, and replication for data durability and availability.

In another embodiment, the common data processing engine 203 includes a stream connector, a dashboard connector, a storage connector, and a deploy connector. The first instance can be deployed using a first instance of the deploy connector in the service catalog 202. The second instance can be deployed using a second instance of the deploy connector in the service catalog 202. An example of the service catalog 202 is illustrated and described below with respect to FIG. 4.

Figure 4:
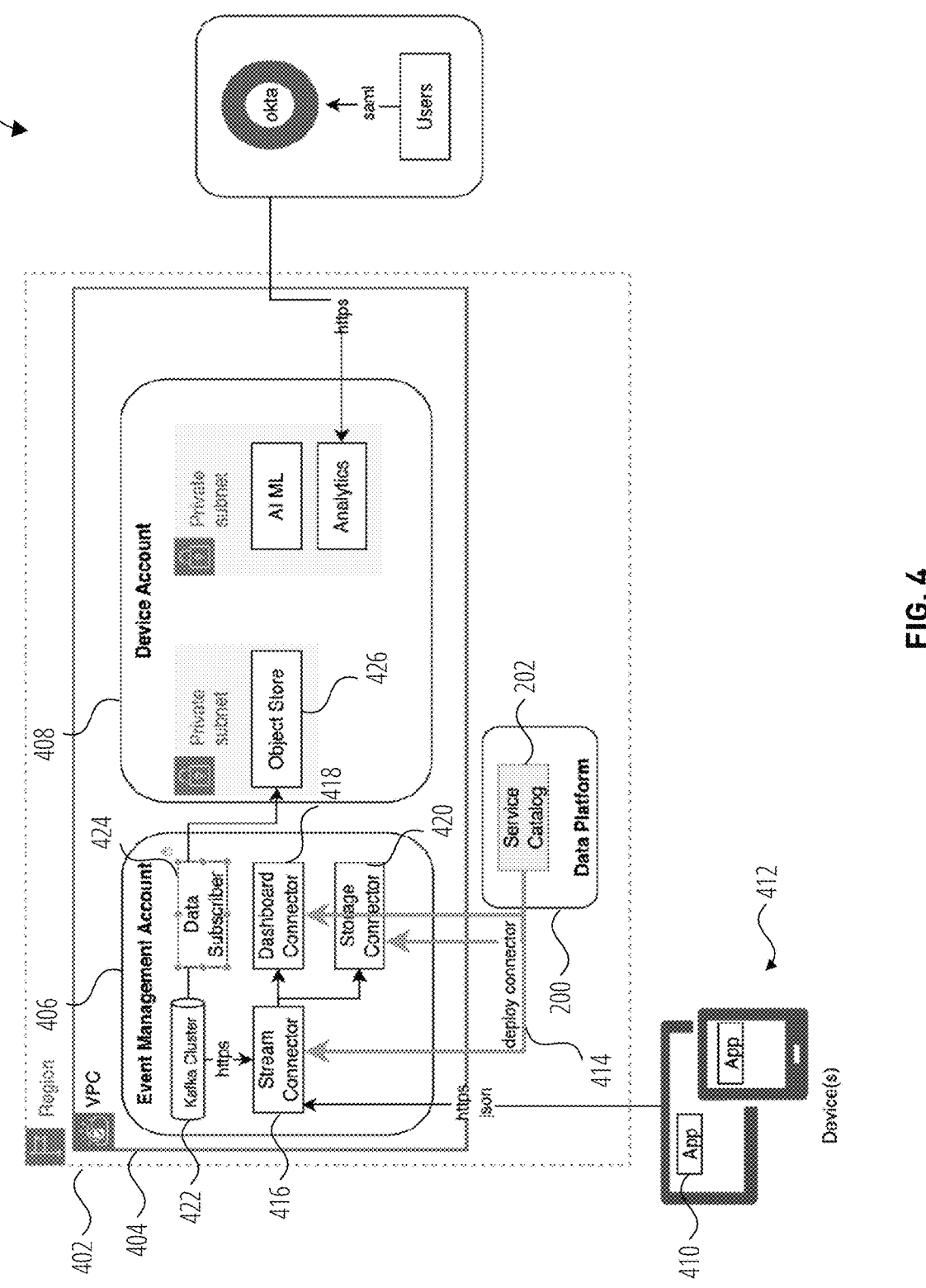
FIG. 4 is a block diagram of a data management platform with a service catalog being deployed in a region of a cellular network according to at least one embodiment.

FIG. 4 is a block diagram of a data management platform 200 with a service catalog 202 being deployed in a region 402 of a cellular network 400 according to at least one embodiment. A VPC 404 can be established in the region 402. Within the VPC 404 can be an event management account 406 and a device account 408. The data management platform 200 can be implemented in the VPC 404. The data management platform 200 can use the service catalog 202 to deploy a common data processing engine (e.g., 203) at the event management account 406 to collect data from a source application 410 of one or more device(s) 412. In this embodiment, the service catalog 202 can use a deploy connector 414 to deploy a stream connector 416, a dashboard connector 418, and a storage connector 420 in the event management account 406. The event management account 406 can also include a Kafka cluster 422 and a data subscriber 424. The stream connector 416, dashboard connector 418, and storage connector 420 facilitate the collection and storage of the data from the source application 410 into an object store 426 associated with the device account 408. The object store 426 can be in a private subnet of the device account 408. The object store 426 can be separated from other private subnets in the device account 408, such as a private subnet with an AI/ML application, an analytics application, or other subscriber services. The service catalog 202 can be used to deploy the common data processing engine in the event management account 406 to collect the data from the source application 410 and store the data in the object store 426 associated with the device account 408. The service catalog 202, which resides in the region 402, can be used to deploy other instances of the common data processing engine in other event management accounts than the event management account 406, and/or for other device accounts than the device account 408. For example, the common data processing engine can include the stream connector 416, the dashboard connector 418, the storage connector 420, and the deploy connector 414, and a first instance can be deployed using a first instance of the deploy connector 414 in the service catalog 202. A second instance can be deployed using a second instance of the deploy connector 414 in the service catalog 202. As such, the service catalog 202 can be used to deploy the common data processing engine (or other data pipelines) in different locations in the cellular network 400. The deployment of the common data processing engine can facilitate the use of the data catalog 201 to provide the singular comprehensive view 204 of the collected data from various tiers and domains in the cellular network 400. An example of the data catalog 201 is illustrated and described below with respect to FIG. 5.

Figure 5:
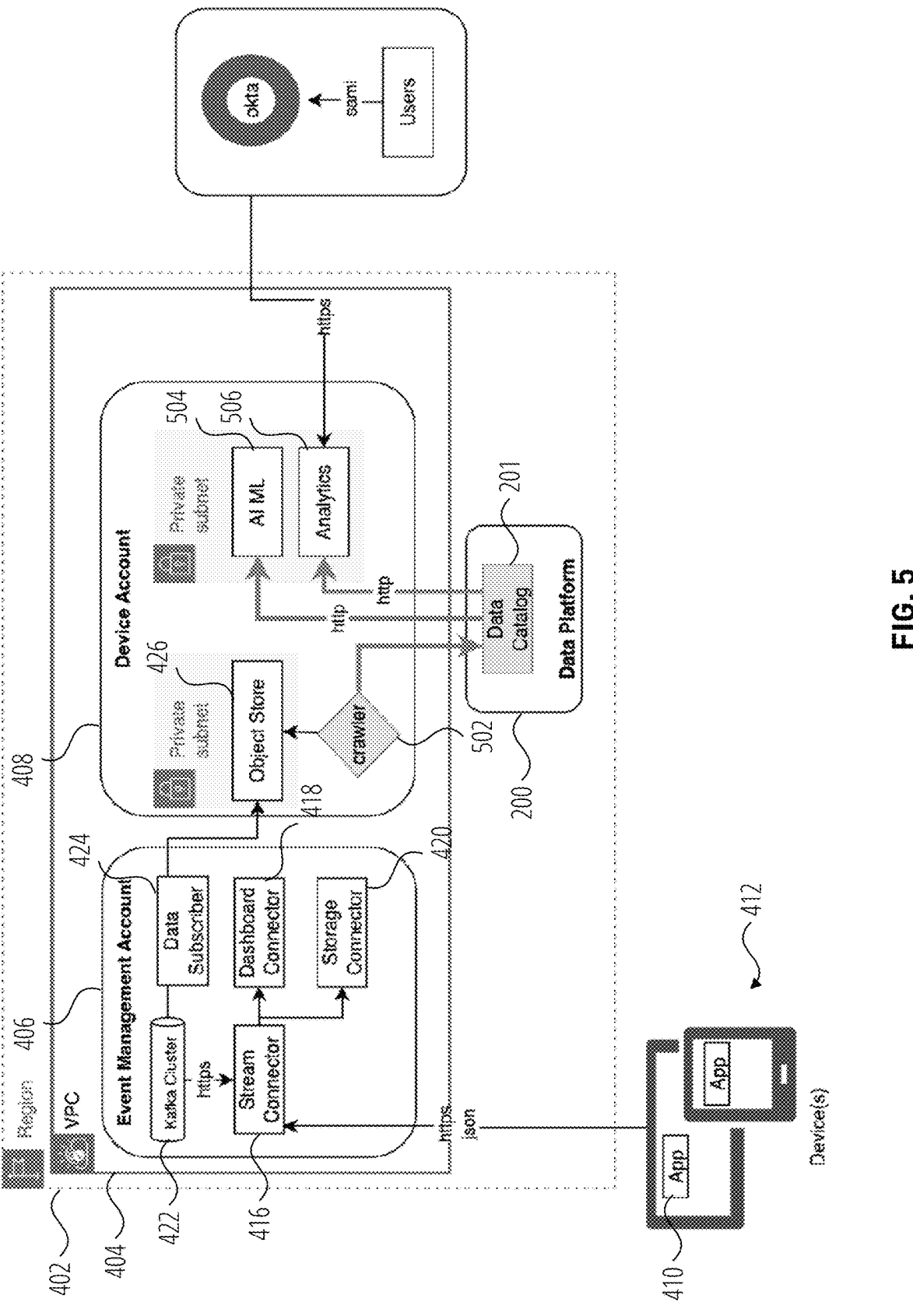
FIG. 5 is a block diagram of a data management platform with a data catalog being deployed in a region of a cellular network according to at least one embodiment.

FIG. 5 is a block diagram of the data management platform 200 with the data catalog 201 being deployed in the region 402 of the cellular network 400 according to at least one embodiment. As illustrated in FIG. 5, once the stream connector 416, the dashboard connector 418, and the storage connector 420 are deployed at the event management account 406, the data catalog 201 can collect the data published from the source application 410 on the one or more device(s) 412. In particular, the data catalog 201 can use a crawler 502 to automatically discover, index, and catalog the data in the object store 426, collected from the source application 410. The data catalog 201 can provide visibility to the data to one or more subscriber services, such as an AI/ML application 504, an analytics application 506, or the like. The AI/ML application 504 can use the data to determine one or more insights for other business logic associated with the device account 408. The analytics application 506 can use the data to determine one or more KPIs as described herein. The data catalog 201 can receive a request from one of the AI/ML application 504, analytics application 506 to provide visibility to the collected data (e.g., first tier data, second tier data, or both). The data catalog 201 can provide isolation between the AI/ML application 504 (or analytics application 506) and the source application 410. In response to the request, the data management platform 200 can provide the data to the AI/ML application 504 (or analytics application 506) to determine one or more insights of network performance irregularities or usage patterns associated with the device account 408 across the different network domains (or tiers) in the region 402 of the cellular network 400. The data management platform 200 (or AI/ML application 504 or analytics application 506) can determine the real-time updates of geospatial information based on the one or more insights. In response to the request, the data management platform 200 can present a GUI with real-time updates of geospatial information in a singular comprehensive view. As described herein, the singular comprehensive view 204 of the GUI can consolidate the one or more insights of network performance irregularities or usage patterns from the data sources into layers (e.g., tiers within the different network domains) within a unified platform, namely the data management platform 200.

Figure 6:
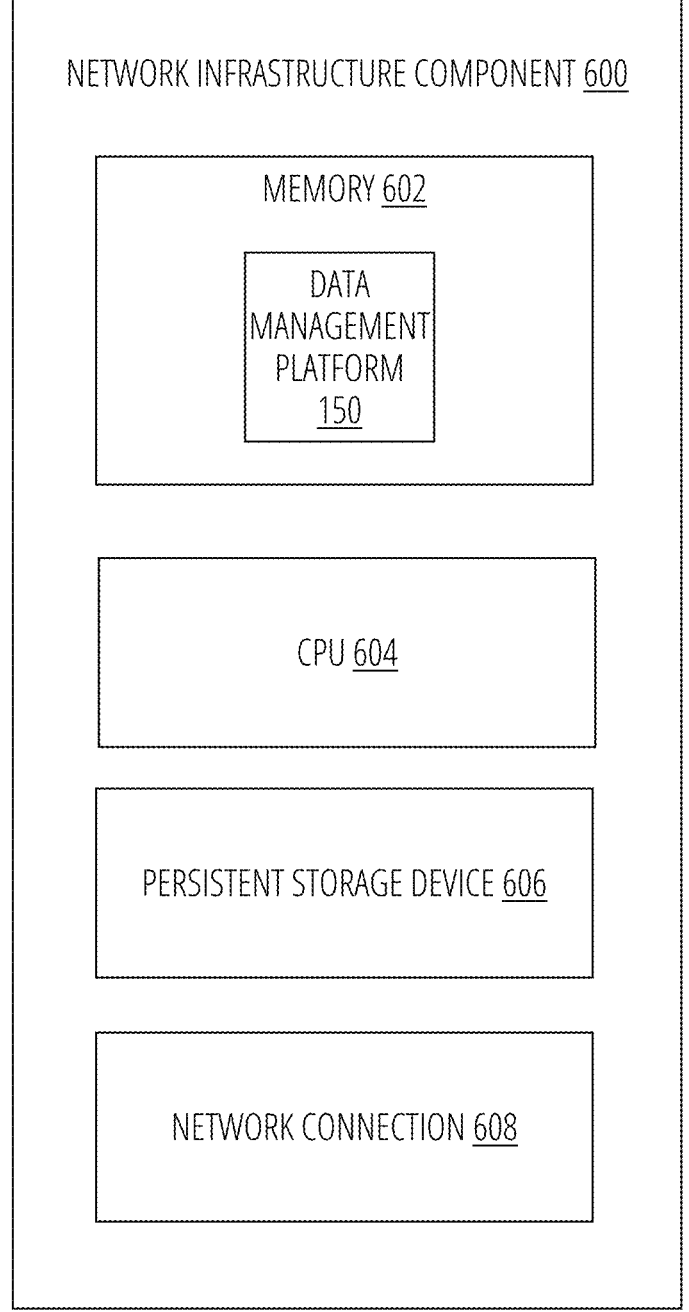
FIG. 6 is a block diagram depicting a network infrastructure component on which at least a portion of the data management platform may operate, according to at least one embodiment.

FIG. 6 is a block diagram depicting a network infrastructure component 600 on which at least a portion of the data management platform 150 may operate, according to at least one embodiment. The network infrastructure component 600 may be: located on a network in a position to communicate with other network infrastructure components and user devices, in order to perform at least part of the functions required in managing a mobile network. A plurality of network infrastructure components may each implement a portion of the distributed data mesh system, thus distributing the system across a plurality of network infrastructure components. In various embodiments, the network infrastructure component 600 includes one or more of the following: a computer memory 602, a central processing unit (CPU) 604, a persistent storage device 606, and a network connection 608. The memory 602 may be used for storing programs and data while they are being used, including data associated with the various network infrastructure components, an operating system including a kernel (not shown), and device drivers (not shown). The CPU 604 may be used for executing computer programs (not shown). The persistent storage device 606 may be a hard drive or flash drive for persistently storing programs and data. The network connection 608 may be used for connecting to one or more network infrastructure components or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, or other network functions, and for connecting to one or more computer devices such as network infrastructure components or other computer systems. In various embodiments, the network infrastructure component 600 additionally includes input and output devices, such as a keyboard, a mouse, display devices, etc.

While a network infrastructure component 600 configured as described may be used in some embodiments, in various other embodiments, the network infrastructure component 600 may be implemented using devices of various types and configurations, and having various components. The memory 602 may include the data management platform 150 which contains computer-executable instructions that, when executed by the CPU 604, cause the network infrastructure component 600 to perform the operations and functions described herein. For example, the programs referenced above, which may be stored in computer memory 602, may include or be comprised of such computer executable instructions. The memory 602 may also include a network infrastructure component data structure.

The data management platform 150 performs the core functions of the network infrastructure component 600, as discussed herein. In particular, the data management platform 150 facilitates the management of creating, modifying, saving, and deploying executable code for collecting, processing, and storing data of a cellular network. The data management platform 150 can facilitate the management of data produced, consumed, stored, or otherwise used or accessible by consumers of the data. Additionally, the data management platform 150 may allow the network infrastructure controller to provide a microservice, data product, etc., to another network infrastructure controller, allow the network infrastructure controller to enforce data governance rules, perform audits, etc., of data produced by, stored on, used by, etc., other network infrastructure controllers, and perform other functions to manage the data management platform as described herein.

In an example embodiment, the data management platform 150 or computer-executable instructions stored on memory 602 of the network infrastructure component 600 are implemented using standard programming techniques. For example, the data management platform 150 or computer executable instructions stored on memory 602 of the network infrastructure component 600 may be implemented as a "native" executable running on CPU 604, along with one or more static or dynamic libraries. In other embodiments, the data management platform 150 or computer-executable instructions stored on memory 602 of the network infrastructure component 600 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the network infrastructure component 600.

In addition, programming interfaces to the data stored as part of the data management platform 150 can be available by standard mechanisms such as through C, C++, C#, Java, and web APIs; libraries for accessing files, databases, or other data repositories; through scripting languages such as JavaScript and VBScript; or through Web servers, File Transfer Protocol (FTP) servers, or other types of servers providing access to stored data. The data management platform 150 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the network infrastructure component 600 and network infrastructure components.

Furthermore, in some embodiments, some or all of the components/portions of the data management platform 150, or functionality provided by the computer-executable instructions stored on memory 602 of the network infrastructure component 600 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer readable medium (e.g., as a hard disk; a memory; a computer network or cellular wireless network; or a portable media article to be read by an appropriate drive or via an appropriate connection, such as a DVD or flash memory device) so as to enable or configure non-transitory computer-readable medium or one or more associated computing systems or devices to execute or otherwise use or provide the contents to perform at least some of the described techniques. The non-transitory computer-readable storage medium includes instructions that when executed by a computing system, cause the computing system to perform operations described herein. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

FIG. 7 is a flow chart of a method 700 of collecting and presenting first tier data and second tier data in a singular comprehensive view according to at least one embodiment. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by the data management platform 150 of FIG. 1 or the data management platform 200 of FIG. 2. In one embodiment, the method 700 is performed by the network infrastructure component 600 of FIG. 6. The method 700 can be performed by other computing systems described herein.

Referring to FIG. 7, the method 700 begins with the processing logic collects, using a data management platform (DMP) executed by a computing system, telemetry data from a plurality of different data sources in different network domains in a cellular network, and storing the telemetry data in an object store associated with one or more sources associated with an application (block 702). The telemetry data includes first tier data and second tier data. The first tier data includes first data collected at a user equipment (UE) location, an edge location, or an end-node location, and has a first range of latency values (block 702). The second tier data includes second data aggregated from the plurality of different data sources and has a second range of latency values (block 704). The second range has higher latency values than the first range. At block 708, the processing logic generates, using a crawler, a data catalog from the telemetry data stored in the object store by automatically discovering, indexing, and cataloging the first data and the second data from the plurality of different data sources in the different network domains. At block 710, the processing logic receives a request from a subscriber service to provide visibility of at least the first tier data or the second tier data. The DMP isolates connections to the plurality of different data sources from the subscriber service. At block 712, the processing logic presents, by the computing system, a graphical user interface (GUI) with real-time updates of geospatial information of the at least one of the first tier data or the second tier data in a singular comprehensive view.

In a further embodiment, the method 700 can be performed by a computing system that is a cloud computing system. That is, the data management platform can be implemented in the cloud computing system. The output executable code providing by the data management platform 150 (or data management platform 200) can be deployed in various locations of a cellular network (or other SDNs) for data collection, management, and storage, such as illustrated and described herein.

In a further embodiment, the processing logic determines, using the DMP and the data catalog, one or more insights of network performance irregularities or usage patterns associated with the account across the different network domains in a region of the cellular network. The processing logic determines, using the DMP, the real-time updates of geospatial information based on the one or more insights.

In a further embodiment, the first tier data or the second tier data includes one or more insights of network performance irregularities or usage patterns associated with the account across the different network domains in a region of the cellular network. The real-time updates of geospatial information can be based on the one or more insights.

In a further embodiment, the first data is associated with a two-way communication service that relies on simultaneous data processing on both a radio access network (RAN) and a network core, the plurality of different data sources includes any combination of two or more of a network function of the network core, a radio unit (RU) of the RAN, a distributed unit (DU) of the RAN, or a centralized unit (CU) of the RAN, and the two-way communication service is at least one of a Voice over New Radio (VoNR), a Short Message Service (SMS), a Multimedia Messaging Service (MMS), or a data accessibility service.

In a further embodiment, the real-time updates of geo-spatial information includes one or more insights of network performance irregularities or usage patterns based on one or more network key performance indicators (KPIs) associated with an account. The one or more KPIs can include one or more of the following: a Mean Opinion Score (MOS); a Data Accessibility KPI; or a Call Retainability KPI. The one or more KPIs can include one or more of the following: a voice quality KPI; a video quality KPI; or a network performance KPI.

In at least one embodiment, the processing logic can determine the voice quality KPI using one or more of the following: call result information including a success, a failure with cause, or a drop; call setup time versus iteration; a MOS versus interaction; a handover success rate; or a handover latency. In at least one embodiment, the processing logic can determine the video quality KPI using one or more of the following: a bitrate; a buffer duration; a buffer rate; a resolution; a number of frames dropped; lag length; or video startup time. In at least one embodiment, the processing logic can determine the network performance KPI using one or more of the following: a frequency band; downstream bandwidth; upstream bandwidth; latency; or a ping duration.

The data catalog can store call information, device information, geolocation information, serving cell information, and Subscriber Identity/Identification Module (SIM) information, such as described above.

FIG. 8 is a flow chart of a method 800 of deploying instances of a common data processing engine in different locations in a cellular network according to at least one embodiment. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 800 is performed by the data management platform 150 of FIG. 1 or the data management platform 200 of FIG. 2. In one embodiment, the method 800 is performed by the network infrastructure component 600 of FIG. 6. The method 800 can be performed by other computing systems described herein.

Referring to FIG. 8, the method 800 begins with the processing logic storing a common data processing engine in a service catalog of a data management platform (DMP) associated with a cellular network (block 802). The common data processing engine is configured to ingest, process, store, and deliver telemetry data from a data source in the cellular network. The telemetry data includes FCAPS data. At block 804, the processing logic deploys, by a computing system executing the DMP, a first instance of the common data processing engine at a first event manager associated with a first data source in a first network domain in the cellular network. The first event manager includes a first data subscriber to output first FCAPS data to an object store associated with an account. At block 806, the processing logic deploys, by the computing system, a second instance of the common data processing engine at a second event manager associated with a second data source in a second network domain in the cellular network, the second network domain being different than the first network domain. The second event manager includes a second data subscriber to output second FCAPS data to the object store associated with the account.

In a further embodiment, the method 800 can be performed by a computing system that is a cloud computing system. That is, the data management platform can be implemented in the cloud computing system. The output executable code providing by the data management platform 150 (or data management platform 200) can be deployed in various locations of a cellular network (or other SDNs) for data collection, management, and storage, such as illustrated and described herein.

In a further embodiment, the common data processing engine includes a stream connector, a dashboard connector, a storage connector, and a deploy connector. At block 804, the processing logic deploys the first instance using a first instance of the deploy connector in the service catalog. At block 806, the processing logic deploys the second instance using a second instance of the deploy connector in the service catalog.

In a further embodiment, the common data processing engine includes a first block to collect one or more data logs from the first data source, a second block to generate one or more messages based on the one or more data logs, an event streaming platform to receive the one or more messages from the second block and to publish the one or more messages, a cloud-based storage unit to receive the one or more data logs from the first block, a third block to generate normalized data from the one or more data logs from the event streaming platform and the one or more messages from the event streaming platform, a fourth block to generate aggregated data from the normalized data, and a fifth block to generate standardized data from the aggregated data. The first FCAPS data includes the standardized data.

In a further embodiment, the first FCAPS data includes first tier data and second tier data, where: the first tier data includes first data collected at a user equipment (UE) location, an edge location, or an end-node location, and has a first range of latency values, and the second tier data includes second data aggregated from the first and second data sources and has a second range of latency values, the second range having higher latency values than the first range.

In a further embodiment, the processing logic generates, using a crawler, a data catalog from the telemetry data stored in the object store by automatically discovering, indexing, and cataloging the first FCAPS data and the second FCAPS data. The processing logic receives a request from a subscriber service to provide visibility of at least the first tier data or the second tier data, where the DMP isolates connections to the first and second data sources from the subscriber service. The processing logic presents a graphical user interface (GUI) with real-time updates of geospatial information of the at least one of the first tier data or the second tier data in a singular comprehensive view.

In a further embodiment, the processing logic determines, using the DMP and the data catalog, one or more insights of network performance irregularities or usage patterns associated with the account across a region of the cellular network. The processing logic determines, using the DMP, the real-time updates of geospatial information based on the one or more insights.

In a further embodiment, the processing logic determines the one or more insights of network performance irregularities or usage patterns by determining, using the data catalog, one or more network key performance indicators (KPIs) associated with the account. The one or more KPIs include one or more of a voice quality KPI, a video quality KPI, or a network performance KPI. The first tier data or the second tier data can include one or more insights of network performance irregularities or usage patterns associated with the account across a region of the cellular network. The real-time updates of geospatial information can be based on the one or more insights.

In at least one embodiment, the first FCAPS data and the second FCAPS data are associated with a two-way communication service that relies on simultaneous data processing on both a radio access network (RAN) and a network core, wherein the first and second data sources comprise any combination of two or more of a network function of the network core, a radio unit (RU) of the RAN, a distributed unit (DU) of the RAN, or a centralized unit (CU) of the RAN, wherein the two-way communication service is at least one of a Voice over New Radio (VoNR), a Short Message Service (SMS), a Multimedia Messaging Service (MMS), or a data accessibility service.

Figure 9:
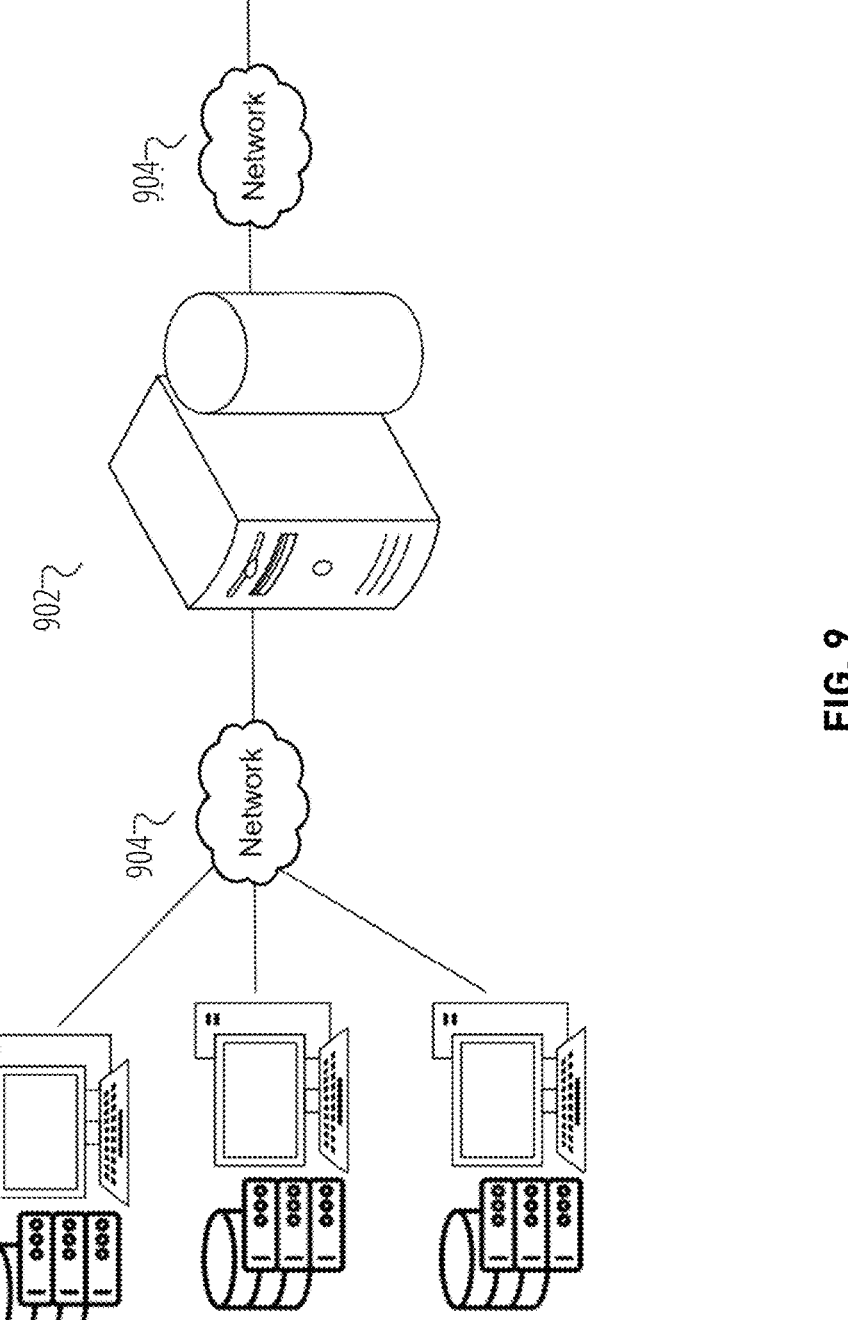
FIG. 9 is a block diagram of an example environment for providing a data management platform with a GUI for creating or modifying graphical objects representing underlying executable code for functions of a cellular network according to at least one embodiment.

FIG. 9 is a block diagram of an example environment 900 for providing a data management platform with a GUI for creating or modifying graphical objects representing underlying executable code for functions of a cellular network according to at least one embodiment. The example environment 900 includes a computing system 902 including one or more computing devices, a network 904, one or more data sources 914, and a user device 916.

The one or more data sources 914 can be located in different sites either on the same network or entirely different networks. Each data source 914 can have its own data included in data files. The data of each data source 914 can include structured data, unstructured data, or both. Structured data refers to data that is organized in a specific format or structure, making it easy to search, process, and analyze using automated tools. This data is typically stored in databases, spreadsheets, or other data management systems. Structured data is characterized by the presence of clearly defined fields, columns, and rows, and often follows a consistent format or syntax. Examples of structured data include financial data, inventory data, customer information, and transactional data. Unstructured data refers to data that is not organized in a specific format or structure, making it difficult to process and analyze using automated tools. This data is often created in a free-form manner and does not follow a consistent syntax. For example, unstructured data is a conglomeration of many varied types of data that are stored in their native formats, which can result in irregularities and ambiguities that make it difficult to understand as compared to structured data. Examples of unstructured data can include emails, social media posts, audio and video recordings, images, and text documents. Unstructured data is more difficult to analyze and interpret than structured data because it requires natural language processing and other advanced techniques to extract insights and meaning. However, unstructured data can provide valuable insights into customer sentiment, market trends, and other areas that are not easily captured by structured data.

Each data source 914 can have one or more data dictionaries describing its data files. The data dictionary can include information or metadata about data of the data files such as attributes, meaning, origin, usage, and format of the data included in the data files. For example, the metadata associated with the data files can include a plurality of features of the data included in the data files. The plurality of features can include at least one of: a file name, a table name, an attribute, a row name, and a column name. One of the features can be an attribute indicating whether a corresponding data file includes unstructured data.

The data dictionaries of the data sources 914 can be used to create a graph database representing metadata of the data files from one or more data sources 914. Specifically, relationships among the plurality of features of different data files can be determined using the data files' data dictionaries. For example, a relationship can be two data files sharing the same attribute. A graph database can be created to reflect the features and the relationships of the features for different data files. The graph database can be represented as a directed graph that includes a set of nodes and a set of edges. Each node can represent a feature of the plurality of features. Each edge can represent a relationship between two nodes in the set of nodes (e.g., relationships among the plurality of features of the data files). As a result, the graph database can include the relationships (e.g., interconnections and interrelationships) of the data files from various data sources with respect to the features of the data files.

In some implementations, the graph database can be generated by the computing system 902 in advance based on the data dictionaries received from the data sources 914. In some implementations, the graph database can be generated by another computing system (not shown). The computing system 902 can access the graph database from that computing system over the network.

The computing system 902 can traverse the graph database to identify unstructured data included in one or more data files from the data sources 914. The computing system 902 can further identify, from the graph database, the data sources 914 of data files that include unstructured data. For example, in a graph database, the data source 914 of each data file can be a represented as a node connected to another node representing the data file. In some implementations, the graph database can include a feature that indicates storage locations of particular data files. The computing system 902 can obtain the unstructured data, based on the storage location of the unstructured data, from the data source 914 and run assessment code on the computing system 902 to check the data quality of the unstructured data. In some implementations, the computing system 902 can provide the assessment code to the data source 914, so that the assessment code can be run at the data source 914.

The assessment code can check whether the unstructured data of the data files satisfies a set of rules. The set of rules can include customized rules that are specific to the use case of the unstructured data. For example, if the unstructured data is a log for user interactions with different applications, the customized rules can include rules to check whether the user's account includes a valid email address, but not whether the user provides a valid physical address. In another example, if the unstructured data includes online shopping orders, the customized rules include rules to check whether the shipping address is a valid physical address, and whether the shipping address is consistent with the postal code. In some implementations, the computing system can use machine learning models to determine the general rules and the customized rules for the unstructured data.

The computing system 902 can generate a data quality report for the unstructured data, including i) the data quality results for the unstructured data in each data file and ii) recommendations of potential modifications for rectifying unstructured data that does not satisfy one or more rules included in the set of rules. The data quality report can be displayed on a user device 916. The user device 916 can be associated with a developer that utilizes the unstructured data for developing data products, artificial intelligence (AI)/machine learning (ML) algorithms, and dashboards. In some implementations, the data quality report can be provided to a user device 916 associated with a data owner of the unstructured data or an administrative user managing the unstructured data.

The computing system 902 can further provide the potential modifications to the unstructured data as a recommendation to the user device 916, so that the user of the user device 916 can determine whether to adopt that modification. In response to receiving the user's confirmation to rectify the unstructured data that does not satisfy the one or more rules, the computing system 902 can proceed to make the modification. The computing system 902 can trigger rectifying code to make the modifications.

In some implementations, the computing system 902 can obtain the unstructured data, based on the storage location of the unstructured data, from the data source 914 and run the rectifying code on the computing system 902. In some implementations, the computing system 902 can provide the rectifying code to the data source 914, so that the rectifying code can be run at the data source 914.

The computing system 902 can include one or more computing devices, such as a server. The number of computing devices may be scaled (e.g., increased or decreased) automatically according to the computation resources needed. The various functional components of the computing system 902 may be installed on one or more computers as separate functional components or as different modules of a same functional component. For example, the various components of the computing system 902 can be implemented as computer programs installed on one or more computers in one or more locations that are coupled to each other through a network. In cloud-based systems, for example, these components can be implemented by individual computing nodes of a distributed computing system.

The user device 916 can include a personal computer, a mobile communication device, and other devices that can communicate with the computing system 902 over the network 904. The network 904 can include a local area network ("LAN"), a wide area network ("WAN"), the Internet, or a combination thereof. Each data source 914 can include one or more computing devices, such as a server. Each data source 914 can have its own database that stores its data files and corresponding data dictionaries.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. A computer storage medium is not a propagated signal. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A non-transitory computer-readable storage medium can include instructions that when executed by a computing system, cause the computing system to perform operations as described herein.

The term "data processing apparatus" encompasses all kinds of apparatus, devices, and machines for processing data, including, by way of example, programmable processors, computers, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., an LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball, or a touchpad. Other kinds of devices can be used to provide for interaction with a user as well; for example, feedback and responses provided to the user can be any form of sensory feedback, e.g., visual, auditory, speech, or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs are configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

collecting, using a data management platform (DMP) executed by a first network component of a cellular network, telemetry data from a plurality of different data sources in different network domains in the cellular network, and storing the telemetry data in an object store associated with one or more sources associated with an application, the telemetry data comprising first tier data and second tier data, wherein:

the plurality of different data sources are located at other network components of the cellular network that are separate from the first network component;

the first tier data comprises first data collected at a user equipment (UE) location, an edge location, or an end-node location, and has a first range of latency values; and the second tier data comprises second data aggregated from the plurality of different data sources and has a second range of latency values, the second range having higher latency values than the first range;

generating, using a crawler executed by the first network component, a data catalog from the telemetry data stored in the object store by automatically discovering, indexing, and cataloging the first data and the second data from the plurality of different data sources in the different network domains;

receiving, at the DMP, a request from a subscriber service to provide visibility of at least the first tier data or the second tier data, wherein the DMP isolates connections to the plurality of different data sources from the subscriber service; and presenting, by the DMP, a graphical user interface (GUI) with real-time updates of geospatial information of the at least one of the first tier data or the second tier data in a singular comprehensive view.

2. The method of claim 1, further comprising:

determining, using the DMP and the data catalog, one or more insights of network performance irregularities or usage patterns associated with an account across the different network domains in a region of the cellular network; and determining, using the DMP, the real-time updates of geospatial information based on the one or more insights.

3. The method of claim 1, wherein the at least the first tier data or the second tier data comprises one or more insights of network performance irregularities or usage patterns associated with an account across the different network domains in a region of the cellular network, wherein the real-time updates of geospatial information are based on the one or more insights.

4. The method of claim 1, wherein:

the first data is associated with a two-way communication service that relies on simultaneous data processing on both a radio access network (RAN) and a network core of the cellular network;

the plurality of different data sources comprises any combination of two or more of a network function of the network core, a radio unit (RU) of the RAN, a distributed unit (DU) of the RAN, or a centralized unit (CU) of the RAN; and the two-way communication service is at least one of a Voice over New Radio (VoNR), a Short Message Service (SMS), a Multimedia Messaging Service (MMS), or a data accessibility service.

5. The method of claim 1, wherein the real-time updates of geospatial information comprise one or more insights of network performance irregularities or usage patterns based on one or more network key performance indicators (KPIs) associated with an account.

6. The method of claim 5, wherein the one or more KPIs comprises at least one of:

a Mean Opinion Score (MOS);
a Data Accessibility KPI; or
a Call Retainability KPI.

7. The method of claim 5, wherein the one or more KPIs comprises at least one of:

a voice quality KPI;
a video quality KPI; or
a network performance KPI.

8. The method of claim 7, wherein:

the voice quality KPI is determined based on at least one of:

call result information including a success, a failure with cause, or a drop;
call setup time versus iteration;
a Mean Opinion Score (MOS) versus interaction;
a handover success rate; or
a handover latency;

the video quality KPI is determined based on at least one of:

a bitrate;
a buffer duration;
a buffer rate;
a resolution;
a number of frames dropped;
lag length; or
video startup time;

the network performance KPI is determined based on at least one of:

a frequency band;
downstream bandwidth;
upstream bandwidth;
latency; or
a ping duration.

9. The method of claim 1, wherein the data catalog stores call information, device information, geolocation information, serving cell information, and Subscriber Identity/Identification Module (SIM) information, wherein:

the call information comprises at least one of a device identifier, an Original Equipment Manufacturer (OEM) name, a device model name, a software version of a device model, a Network Capability Awareness (NCA) version, or a Forced Roaming status;

the device information comprises at least one or more of an operating system (OS) name, an OS version, a release number, the device identifier, the device model name, a product identifier, a brand identifier, a display identifier, a hardware identifier, a manufacturer identifier, a serial number, a user identifier, or a host identifier;

the geolocation information comprises at least one of a latitude/longitude coordinates, a Global Positioning System (GPS) status, a cell identity, a Physical Cell Identifier (PCI), a Tracking Area Code (TAC), a Mobile Country Code (MCC), a Mobile Network Code (MNC), a Radio Access Technology (RAT), a band identifier, an Absolute Radio Frequency Channel Number (ARFCN), a Reference Signal Received Power (RSRP), a Reference Signal Received Quality (RSRQ), a Signal to Interference plus Noise Ratio (SINR), or a signal strength; and the SIM information comprises at least one of a SIM country code, a SIM network code, or a SIM operator name.

10. The method of claim 1, wherein the DMP is implemented in a cloud computing system, wherein the object store resides in a private subnet of a virtual private cloud (VPC), the private subnet being associated with an account.

11. A non-transitory computer-readable storage medium, the computer-readable storage medium including instructions that when executed by a first network component of a cellular network, cause the first network component to perform operations comprising:

collecting telemetry data associated with an account from a plurality of different data sources in different network domains in the cellular network, and storing the telemetry data in an object store, the telemetry data comprising first tier data and second tier data, wherein:

the plurality of different data sources are located at other network components of the cellular network that are separate from the first network component;

the first tier data comprises first data collected at a user equipment (UE) location, an edge location, or an end-node location, and has a first range of latency values; and the second tier data comprises second data aggregated from the plurality of different data sources and has a second range of latency values, the second range having higher latency values than the first range;

generating, using a crawler executed by the first network component, a data catalog from the telemetry data stored in the object store by automatically discovering, indexing, and cataloging the first data and the second data from the plurality of different data sources in the different network domains;

receiving a request from a subscriber service to provide visibility of at least the first tier data or the second tier data, wherein connections to the plurality of different data sources are isolated from the subscriber service; and presenting a graphical user interface (GUI) with real-time updates of geospatial information of the at least one of the first tier data or the second tier data in a singular comprehensive view.

12. The non-transitory computer-readable storage medium of claim 11, wherein the operations further comprise:

determining, using the data catalog, one or more insights of network performance irregularities or usage patterns associated with the account across the different network domains in a region of the cellular network; and determining the real-time updates of geospatial information based on the one or more insights.

13. The non-transitory computer-readable storage medium of claim 11, wherein the at least the first tier data or the second tier data comprises one or more insights of network performance irregularities or usage patterns associated with the account across the different network domains in a region of the cellular network, wherein the real-time updates of geospatial information are based on the one or more insights.

14. The non-transitory computer-readable storage medium of claim 11, wherein:

the first data is associated with a two-way communication service that relies on simultaneous data processing on both a radio access network (RAN) and a network core of the cellular network;

the plurality of different data sources comprises any combination of two or more of a network function of the network core, a radio unit (RU) of the RAN, a distributed unit (DU) of the RAN, or a centralized unit (CU) of the RAN; and the two-way communication service is at least one of a Voice over New Radio (VoNR), a Short Message Service (SMS), a Multimedia Messaging Service (MMS), or a data accessibility service.

15. The non-transitory computer-readable storage medium of claim 11, wherein the real-time updates of geospatial information comprise one or more insights of network performance irregularities or usage patterns based on one or more network key performance indicators (KPIs) associated with an account, wherein the one or more KPIs comprises at least one of:

a voice quality KPI;

a video quality KPI; or a network performance KPI.

16. The non-transitory computer-readable storage medium of claim 15, wherein:

the voice quality KPI is determined based on at least one of:

call result information including a success, a failure with cause, or a drop;

call setup time versus iteration;

a Mean Opinion Score (MOS) versus interaction;

a handover success rate; or a handover latency;

the video quality KPI is determined based on at least one of:

a bitrate;

a buffer duration;

a buffer rate;

a resolution;

a number of frames dropped;

lag length; or video startup time;

the network performance KPI is determined based on at least one of:

a frequency band;

downstream bandwidth;

upstream bandwidth;

latency; or a ping duration.

17. The non-transitory computer-readable storage medium of claim 11, wherein the data catalog stores call information, device information, geolocation information, serving cell information, and Subscriber Identity/Identification Module (SIM) information, wherein:

the call information comprises at least one of a device identifier, an Original Equipment Manufacturer (OEM) name, a device model name, a software version of a device model, a Network Capability Awareness (NCA) version, or a Forced Roaming status;

the device information comprises at least one or more of an operating system (OS) name, an OS version, a release number, the device identifier, the device model name, a product identifier, a brand identifier, a display identifier, a hardware identifier, a manufacturer identifier, a serial number, a user identifier, or a host identifier;

the geolocation information comprises at least one of a latitude/longitude coordinates, a Global Positioning System (GPS) status, a cell identity, a Physical Cell Identifier (PCI), a Tracking Area Code (TAC), a Mobile Country Code (MCC), a Mobile Network Code (MNC), a Radio Access Technology (RAT), a band identifier, an Absolute Radio Frequency Channel Number (ARFCN), a Reference Signal Received Power (RSRP), a Reference Signal Received Quality (RSRQ), a Signal to Interference plus Noise Ratio (SINR), or a signal strength; and the SIM information comprises at least one of a SIM country code, a SIM network code, or a SIM operator name.

18. A first network component of a cellular network, the first network component comprising:

one or more processors; and one or more memories storing instructions that, when executed by the one or more processors, configure the first network component to execute a data management platform (DMP) and a crawler, the DMP to perform operations comprising:

collecting telemetry data associated with an account from a plurality of different data sources in different network domains in the cellular network, and storing the telemetry data in an object store, the telemetry data comprising first tier data and second tier data, wherein:

the plurality of different data sources are located at other network components of the cellular network that are separate from the first network component;

the first tier data comprises first data collected at a user equipment (UE) location, an edge location, or an end-node location, and has a first range of latency values; and the second tier data comprises second data aggregated from the plurality of different data sources and has a second range of latency values, the second range having higher latency values than the first range;

generating, using the crawler, a data catalog from the telemetry data stored in the object store by automatically discovering, indexing, and cataloging the first data and the second data from the plurality of different data sources in the different network domains;

receiving a request from a subscriber service to provide visibility of at least the first tier data or the second tier data, wherein the DMP isolates connections to the plurality of different data sources from the subscriber service; and presenting a graphical user interface (GUI) with real-time updates of geospatial information of the at least one of the first tier data or the second tier data in a singular comprehensive view.

19. The first network component of claim 18, wherein the at least the first tier data or the second tier data comprises one or more insights of network performance irregularities or usage patterns associated with the account across the different network domains in a region of the cellular network, wherein the real-time updates of geospatial information are based on the one or more insights.

20. The first network component of claim 18, wherein:
the first data is associated with a two-way communication service that relies on simultaneous data processing on both a radio access network (RAN) and a network core of the cellular network;

the plurality of different data sources comprises any combination of two or more of a network function of the network core, a radio unit (RU) of the RAN, a distributed unit (DU) of the RAN, or a centralized unit (CU) of the RAN; and the two-way communication service is at least one of a Voice over New Radio (VoNR), a Short Message Service (SMS), a Multimedia Messaging Service (MMS), or a data accessibility service.

21. The first network component of claim 18, wherein the real-time updates of geospatial information comprise one or more insights of network performance irregularities or usage patterns based on one or more network key performance indicators (KPIs) associated with an account, wherein the one or more KPIs comprises at least one of:
a voice quality KPI;
a video quality KPI; or
a network performance KPI.

22. The first network component of claim 18, further comprising a cloud computing system comprising the first network component, and wherein the DMP is implemented in the cloud computing system.

* * * * *